(12) United States Patent
Chitpasong

(10) Patent No.: US 10,725,724 B2
(45) Date of Patent: Jul. 28, 2020

(54) INFORMATION PROCESSING SYSTEM, METHOD OF CONTROLLING INFORMATION PROCESSING SYSTEM, AND PORTABLE TERMINAL

(71) Applicant: KONICA MINOLTA, INC., Chiyoda-ku, Tokyo (JP)

(72) Inventor: Bounta Chitpasong, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/919,318

(22) Filed: Mar. 13, 2018

(65) Prior Publication Data
US 2018/0267769 A1 Sep. 20, 2018

(30) Foreign Application Priority Data

Mar. 17, 2017 (JP) .................................. 2017-052843

(51) Int. Cl.
*G06F 3/14* (2006.01)
*G06F 3/041* (2006.01)
(Continued)

(52) U.S. Cl.
CPC ............ *G06F 3/1454* (2013.01); *G06F 3/041* (2013.01); *G06F 3/0488* (2013.01); *G06F 3/1204* (2013.01); *G06F 3/1256* (2013.01); *G06F 3/1292* (2013.01); *G06F 3/147* (2013.01); *H04N 1/00244* (2013.01); *H04N 1/00307* (2013.01); *H04N 1/00411* (2013.01);
(Continued)

(58) Field of Classification Search
CPC .... G06F 3/1454; G06F 3/1204; G06F 3/1256; G06F 3/0488; G06F 3/041; G06F 3/147; G06F 3/1292; H04N 1/0035
See application file for complete search history.

(56) References Cited

U.S. PATENT DOCUMENTS

2014/0155121 A1* 6/2014 Haba .................. H04N 1/00129
455/557
2015/0002615 A1* 1/2015 Yasoshima ............... H04N 7/15
348/14.08
(Continued)

FOREIGN PATENT DOCUMENTS

JP 2015092304 A 5/2015
JP 2016045725 A 4/2016

*Primary Examiner* — Premal R Patel
(74) *Attorney, Agent, or Firm* — Buchanan Ingersoll & Rooney PC

(57) ABSTRACT

An information processing system including an image forming apparatus and a portable terminal that is allowed to communicate with the image forming apparatus, includes a hardware processor that: determines whether a cooperative screen for cooperating with the image forming apparatus includes an operation-receiving region for receiving an operation by a user, the cooperative screen being displayed on a display of the portable terminal; extracts, from the cooperative screen, an image corresponding to an operating region including the operation-receiving region when the hardware processor determines that the cooperative screen includes the operation-receiving region; and displays, on a display of the image forming apparatus, the image corresponding to the operating region extracted by the hardware processor.

23 Claims, 19 Drawing Sheets

(51) Int. Cl.
*G06F 3/0488* (2013.01)
*G06F 3/12* (2006.01)
*G06F 3/147* (2006.01)
*H04N 1/00* (2006.01)

(52) U.S. Cl.
CPC ..... *H04N 1/00413* (2013.01); *H04N 1/00424* (2013.01); *H04N 1/00432* (2013.01); *H04N 1/00435* (2013.01); *H04N 1/00474* (2013.01); *H04N 1/00482* (2013.01); *H04N 1/00973* (2013.01); *G09G 2320/08* (2013.01); *G09G 2340/02* (2013.01); *G09G 2370/022* (2013.01); *G09G 2370/04* (2013.01); *H04N 2201/0039* (2013.01); *H04N 2201/0074* (2013.01); *H04N 2201/0094* (2013.01); *H04N 2201/0096* (2013.01)

(56) References Cited

U.S. PATENT DOCUMENTS

2015/0373066 A1* 12/2015 Miao ............... G09G 5/14
                                                          715/753
2017/0150227 A1*  5/2017 Kim ................ H04N 21/4126

\* cited by examiner

| SCREEN IDs (710) | PRESENCE/ABSENCE OF OPERATION-RECEIVING REGION (720) | RANGE OF OPERATING REGION (730) |
|---|---|---|
| 001 | PRESENCE | (X1,Y1) TO (X2,Y2) |
| 002 | ABSENCE | null |
| 003 | PRESENCE | (X3,Y3) TO (X4,Y4) |
| ⋮ | ⋮ | ⋮ |

| ITEM IDs | ITEMS | NEED OF INPUT | IMAGE DATA | RANGES | HISTORIES |
|---|---|---|---|---|---|
| 001A | SCAN SIZE | NOT REQUIRED | * * * | (X5,Y5) TO (X6,Y6) | Auto detect |
| 001B | RESOLUTION | NOT REQUIRED | * * * | (X7,Y7) TO (X8,Y8) | 300dpi |
| 001C | COLOR MODE | REQUIRED | * * * | (X9,Y9) TO (X10,Y10) | Full color |
| 001D | ORIGINAL TYPE | NOT REQUIRED | * * * | (X11,Y11) TO (X12,Y12) | — |
| ... | ... | ... | ... | ... | ... |

810  820  830  840  850  860

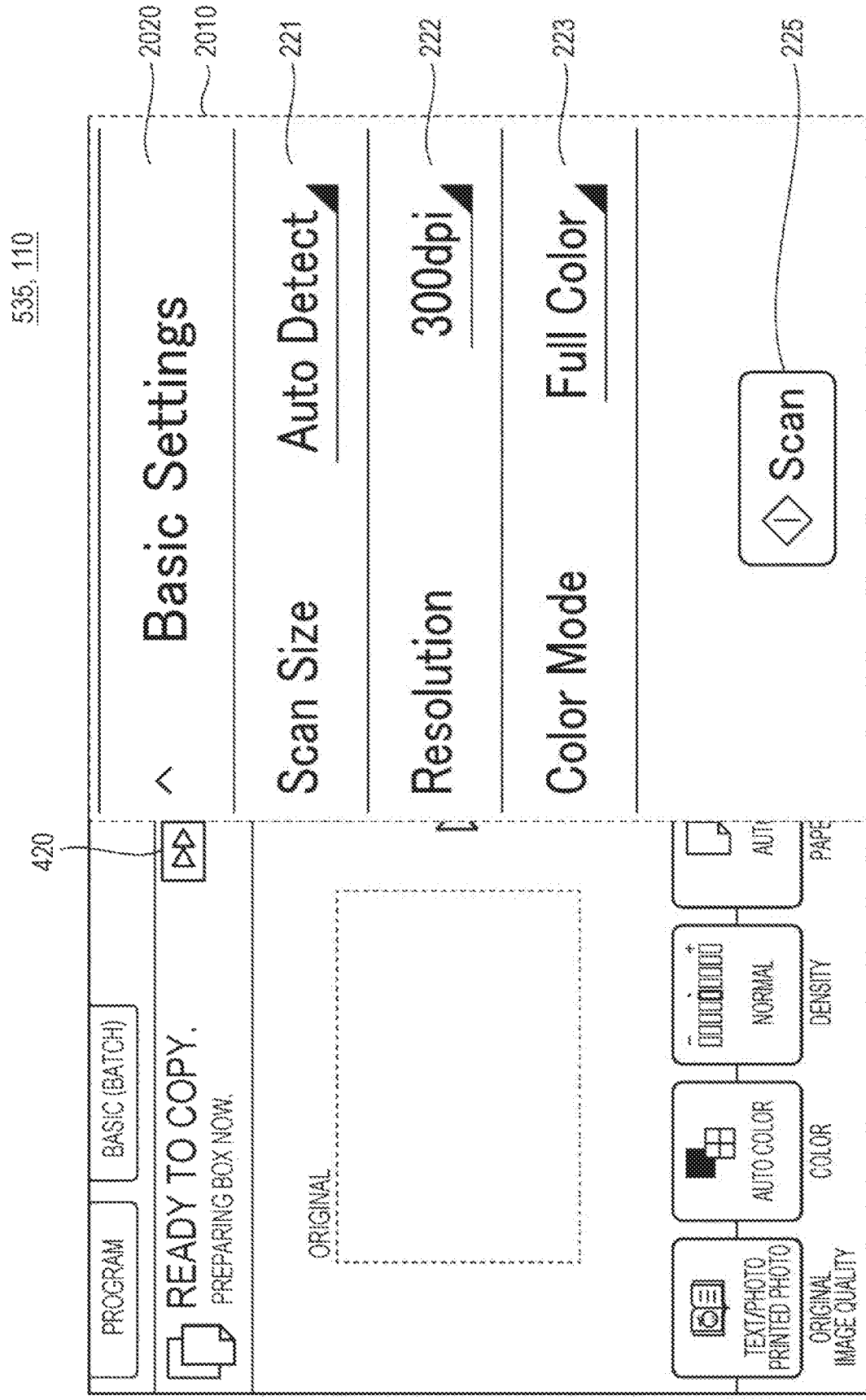

INFORMATION PROCESSING SYSTEM, METHOD OF CONTROLLING INFORMATION PROCESSING SYSTEM, AND PORTABLE TERMINAL

The entire disclosure of Japanese patent Application No. 2017-052843, filed on Mar. 17, 2017, is incorporated herein by reference in its entirety.

BACKGROUND

Technological Field

The present disclosure relates to an information processing system, and more particularly relates to processing of sharing a screen between an image forming apparatus and a portable terminal.

Description of the Related Art

In recent years, portable terminals, such as smartphones, connectable to the Internet have been rapidly widespread. In accordance with the rapid spread, an image forming apparatus that cooperates with cloud computing through a network possessed by a portable terminal has been proposed. For example, such an image forming apparatus can store image data of an original copy captured by the image forming apparatus, into a server through a portable terminal or can perform printing in accordance with image data stored in the server.

For the image forming apparatus cooperating with the portable terminal described above, a technology for improving the convenience of a user has been proposed. For example, JP 2016-045725 A discloses "a display apparatus including: a display that displays, on a screen, display data including at least either image data or drawing data corresponding to the operation by a user; an extractor that extracts partial display data specified by the user, from the display data displayed on the display; a generator that generates image data having a shape corresponding to a portable terminal, on the basis of the extracted display data; and a transmitter that transmits the image data to the portable terminal" (refer to "abstract").

For a technology for sharing a screen between an information display apparatus and a radio communication terminal, JP 2015-092304 A discloses "an information display apparatus that detects the size, orientation, and identification information of a radio communication terminal when detecting the location of the radio communication terminal on the information display apparatus, determines a clipping range with the pieces of information and a device information table, reads data of the clipping range from a memory, and transmits the data to the radio communication terminal (refer to "abstract").

When using a cooperative function between a portable terminal and an image forming apparatus, a user alternately operates the portable terminal and the image forming apparatus in some cases. For example, the user operates an application screen capable of cooperating with the image forming apparatus on the portable terminal, after mounting an original copy on a scanner of the image forming apparatus. When unsatisfied with a result of the scanning, the user mounts the original copy on the scanner again and operates the portable terminal.

In order to reduce such an intricate operation, a technology for sharing the application screen on the portable terminal side with the image forming apparatus has been proposed. Here, examples of the portable terminal include a tablet and a smartphone, and thus the size of a screen varies depending on the type of the portable terminal. The application screen displayed on a large terminal, such as the tablet, is reduced in size to be displayed on a display of the image forming apparatus. Consequently, in some cases, the user has difficulty in checking and operating the application screen on the display of the image forming apparatus. Therefore, a technology is required for displaying the screen of the portable terminal on the display of the image forming apparatus such that the user can easily views the screen.

SUMMARY

The present disclosure has been made in order to solve the problem, and an object of an aspect of the present disclosure is to provide a technology of displaying a screen of a portable terminal on a display of an image forming apparatus such that a user can easily views the screen.

To achieve the abovementioned object, according to an aspect of the present invention, an information processing system including an image forming apparatus and a portable terminal that is allowed to communicate with the image forming apparatus, reflecting one aspect of the present invention comprises a hardware processor that: determines whether a cooperative screen for cooperating with the image forming apparatus includes an operation-receiving region for receiving an operation by a user, the cooperative screen being displayed on a display of the portable terminal; extracts, from the cooperative screen, an image corresponding to an operating region including the operation-receiving region when the hardware processor determines that the cooperative screen includes the operation-receiving region; and displays, on a display of the image forming apparatus, the image corresponding to the operating region extracted by the hardware processor.

BRIEF DESCRIPTION OF THE DRAWINGS

The objects, advantages, aspects, and features provided by one or more embodiments of the invention will become more fully understood from the detailed description given hereinbelow and the appended drawings which are given by way of illustration only, and thus are not intended as a definition of the limits of the present invention:

FIG. 7 is a table of an exemplary data structure of extraction information;

FIG. 8 is a table of an exemplary data structure of a cooperative screen DB;

FIG. 20 is a diagram for describing processing, of sharing a screen of a portable terminal with an image forming apparatus in an information processing system according to a fourth embodiment.

DETAILED DESCRIPTION OF EMBODIMENTS

Hereinafter, one or more embodiments of the present invention will be described in detail with reference to the drawings. However, the scope of the invention is not limited to the disclosed embodiments. The same components are denoted with the same reference signs in the following descriptions. Designations and functions of such components are identical. Therefore, the detailed descriptions thereof will not be repeated. Note that each embodiment and each modification to be described below may be appropriately and selectively combined.

[Related Technology]

Figure 1:
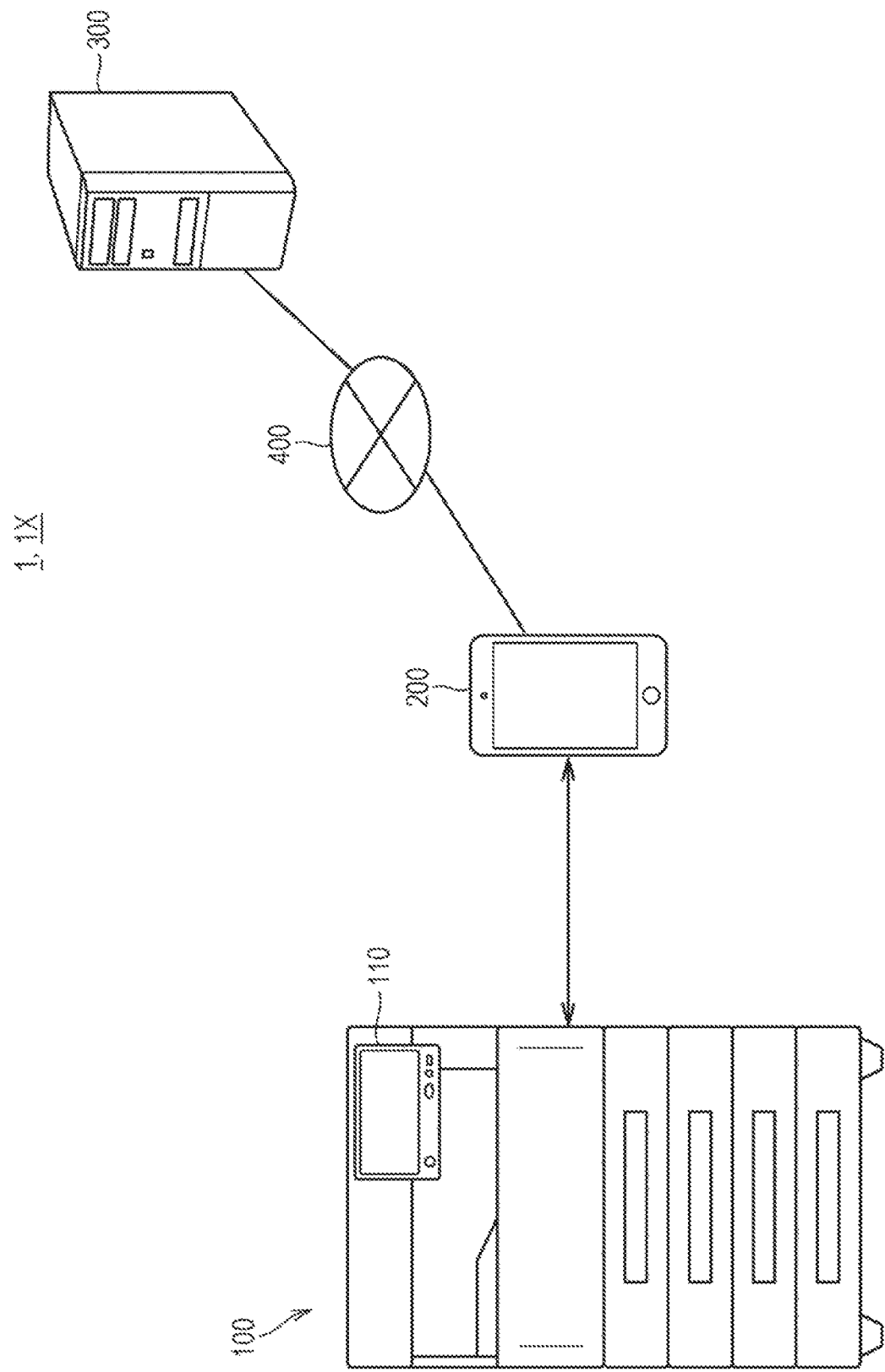
FIG. 1 is a diagram of the configuration of an information processing system according to an embodiment and an information processing system according to a related technology.

FIG. 1 illustrates the configuration of an information processing system 1 according to an embodiment and an information processing system 1X according to a related technology. The hardware configuration of the information processing system 1 is the same as the hardware configuration of the information processing system 1X. Therefore, the configuration of the information processing system 1 will be described below.

The information processing system 1 according to the embodiment includes a image forming apparatus 100, a portable terminal 200, and a server 300. The image forming apparatus 100 is allowed to communicate with the portable terminal 200. The portable terminal 200 is allowed to communicate with the server 300 through a network 400. The image forming apparatus 100 includes an operating panel 110 including a display.

The portable terminal 200 includes an application for cooperating with the image forming apparatus 100. A processor in the portable terminal 200 reads and executes the application, so that an instruction (e.g., a scanning instruction) can be transmitted to the image forming apparatus 100.

Figure 2:
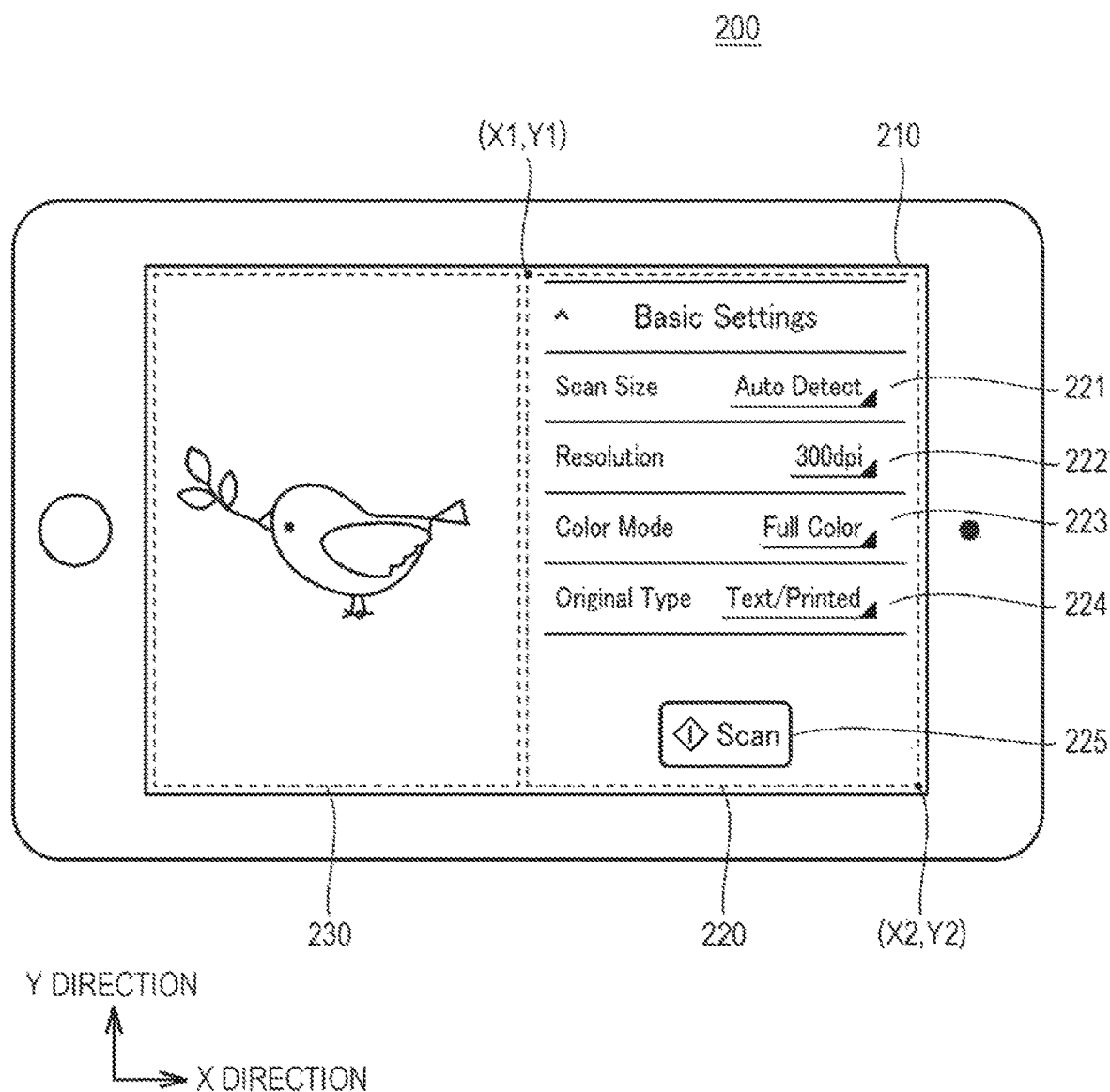
FIG. 2 is a view of a screen displayed on a display of a portable terminal.

FIG. 2 illustrates a screen 210 displayed on a display of the portable terminal 200. The screen 210 is an application screen for cooperating with the image forming apparatus 100. The screen 210 includes an operating region 220 and a preview region 230. The operating region 220 includes items 221 to 225 (an operation-receiving region) for receiving the operation by a user. The items 221 to 225 relate to scanning settings for the image forming apparatus 100. Specifically, the item 221 indicates a setting for the size of an original copy to be captured. The item 222 indicates a setting for resolution. The item 223 indicates a setting for a color mode (e.g., monochrome or full color). The item 224 indicates a setting for the type of the original copy (e.g., text or photo). The item 225 indicates a return button. The preview region 230 displays an image scanned by the image forming apparatus 100.

Figure 3:
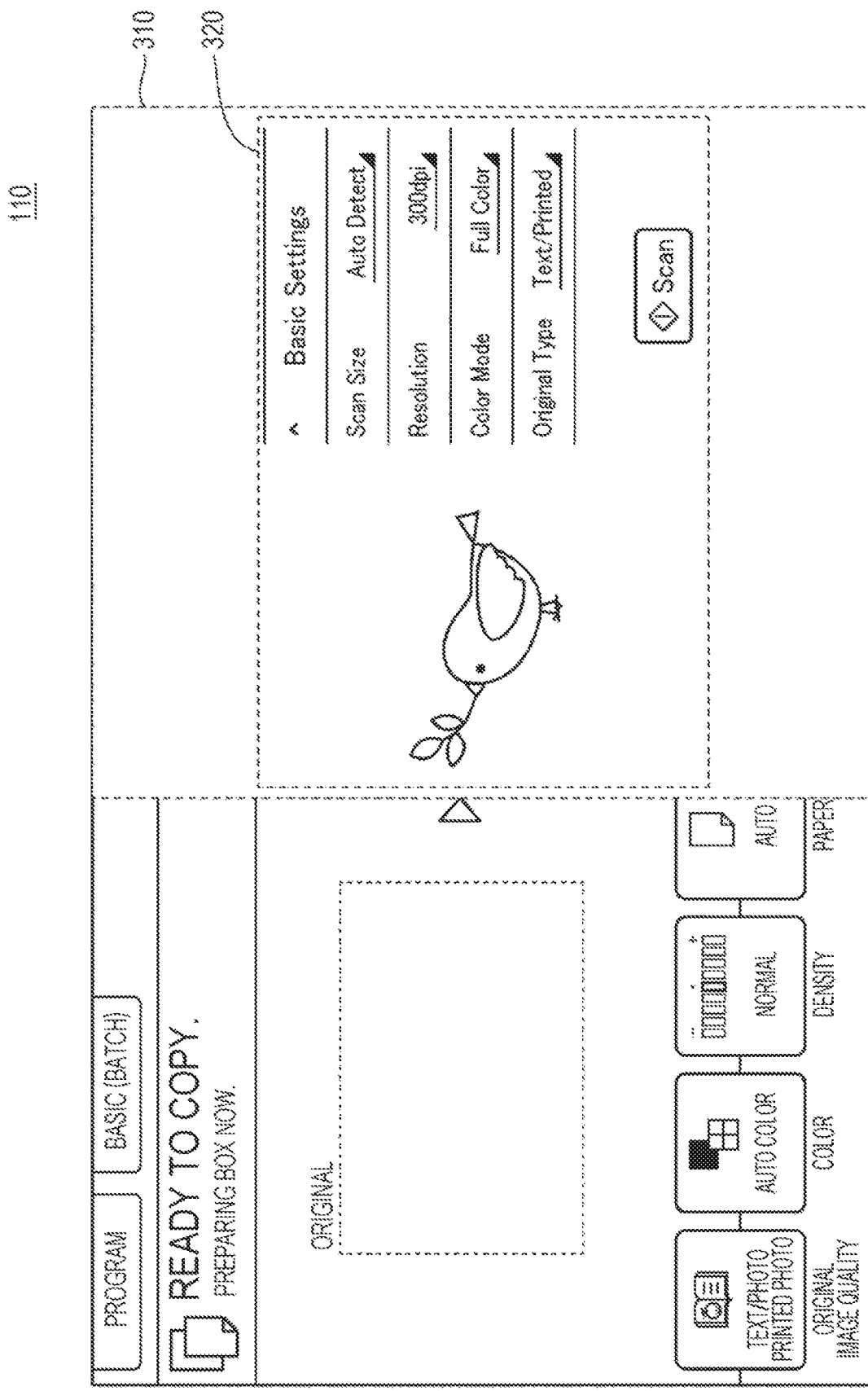
FIG. 3 is a diagram for describing processing of sharing the screen of the portable terminal with an image forming apparatus in the information processing system according to the related technology.

FIG. 3 is a diagram for describing processing of sharing the screen of the portable terminal 200 with the image thrilling apparatus 100 in the information processing system 1X according to the related technology.

The display of the operating panel 110 includes a cooperative region 310. The cooperative region 310 is a region for sharing the screen of the portable terminal 200, particularly, the screen for cooperating with the image forming apparatus 100. The information processing system 1X according to the related technology displays the screen 210 of the portable terminal 200 of FIG. 2 on a region 320 of the cooperative region 310, while keeping the aspect ratio of the screen 210 unchanged. That is, the operating panel 110 displays the screen displayed on the display of the portable terminal 200, the screen structure remaining intact. In this case, a portion corresponding to the operating region 220 included in the operating panel 110 is small. Therefore, the user has difficulty in viewing the portion. The intervals are narrow between images corresponding to the items 221 to 225, and thus the user has difficulty in performing a touch operation and, in some cases, operates wrong. The information processing system 1 according to the embodiment solves the problem in the information processing system 1X according to the related technology.

[Technical Idea]

Figure 4:
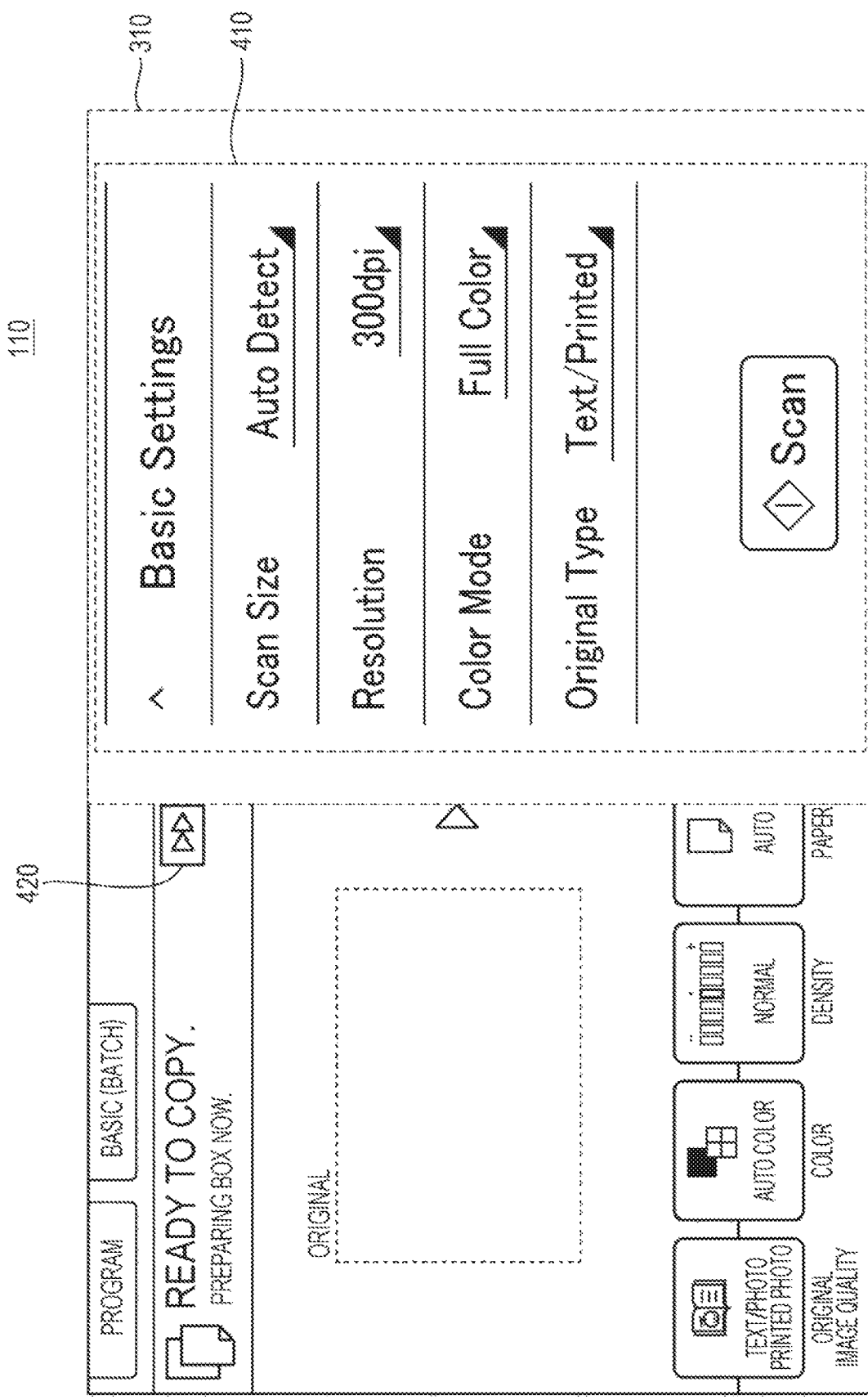
FIG. 4 is a diagram for describing processing of sharing the screen of the portable terminal with an image forming apparatus in the information processing system according to the embodiment.

FIG. 4 is a diagram for describing processing of sharing the screen of the portable terminal 200 with the image forming apparatus 100 in the information processing system 1 according to the embodiment.

The display of the operating panel 110 includes the cooperative region 310 for sharing the screen of the portable terminal 200. The information processing system 1 according to the embodiment determines whether the screen 210 for cooperating with the image forming apparatus 100, displayed on the display of the portable terminal 200, includes the operation-receiving region for receiving the operation by the user. The screen 210 includes the items 221 to 225 as the operation-receiving region. Therefore, the information processing system 1 determines that the screen 210 includes the operation-receiving region, and extracts the operating region 220 including the operation-receiving region. The information processing system 1 displays an image 410 corresponding to the operating region 220, on the cooperative region 310 of the operating panel 110. In this manner, the information processing system 1 according to the embodiment can make the image 410, corresponding to the operating region 220 requiring the operation by the user, larger than the image displayed by the information processing system 1X according to the related technology. Consequently, the user can easily view the information necessary for the operation and can easily operate. The specific configuration and control of the information processing system 1 according to the embodiment will be described below.

[Hardware Configuration]

(Image Forming Apparatus 100)

Figure 5:
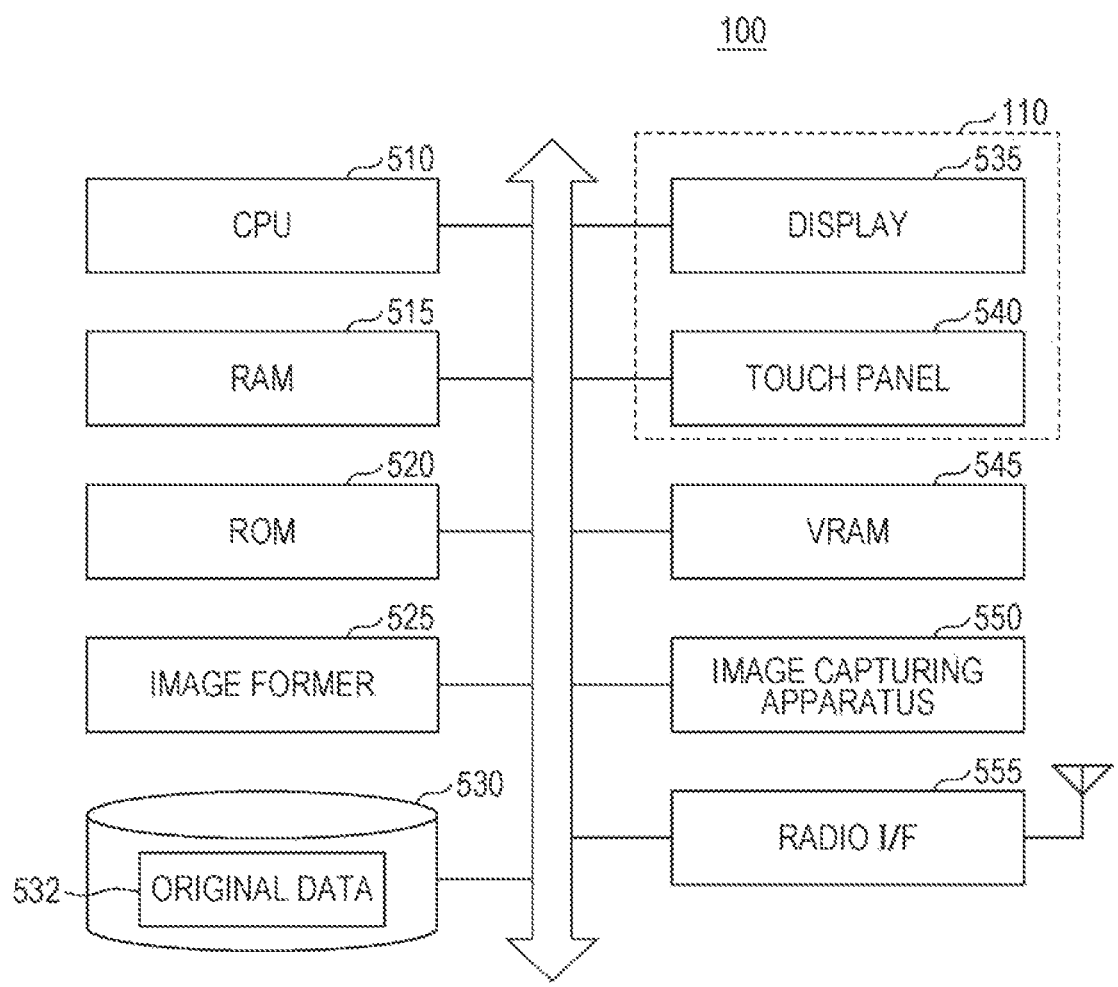
FIG. 5 is a block diagram of an exemplary configuration of the image forming apparatus according to the embodiment.

FIG. 5 is a block diagram of an exemplary configuration of the image forming apparatus 100 according to the embodiment. Referring to FIG. 5, the image forming apparatus 100 includes a central processing unit (CPU) 510, a random access memory (RAM) 515, a read, only memory (ROM) 520, an image former 525, a storage device 530, the operating panel 110, a video random access memory (VRAM) 545, an image capturing apparatus 550, and a radio interface (I/F) 555.

The CPU 510 reads and executes a control program stored in the ROM 520, to control the operation of the image forming apparatus 100. The RAM 515 functions as a working memory when the CPU 510 executes the program. The image former 525 forms an image into a recording medium, on the basis of original data generated by the image capturing apparatus 550 or image data input through the radio interface (I/F) 555.

The storage device 530 includes a non-volatile memory. The storage device 530 stores the original data 532 generated by the image capturing apparatus 550. The operating panel 110 includes the display 535 and a touch panel 540. The operating panel 110 outputs information regarding a position (coordinates) selected by the user through the touch panel 540, to the CPU 510. The VRAM 545 functions as a memory for retaining details to be displayed on the display 535. The image capturing apparatus 550 optically reads an original copy mounted on a platen glass, not illustrated, to generate the original data. The radio I/F 555 is allowed to communicate with a radio I/F 650 included in the portable terminal 200 to be described later. The radio I/F 555 and the radio I/F 650 communicate with each other in accordance with the standards such as Wireless Fidelity (WiFi), Bluetooth (registered trademark), and near field communication (NFC).

(Portable Terminal 200)

Figure 6:
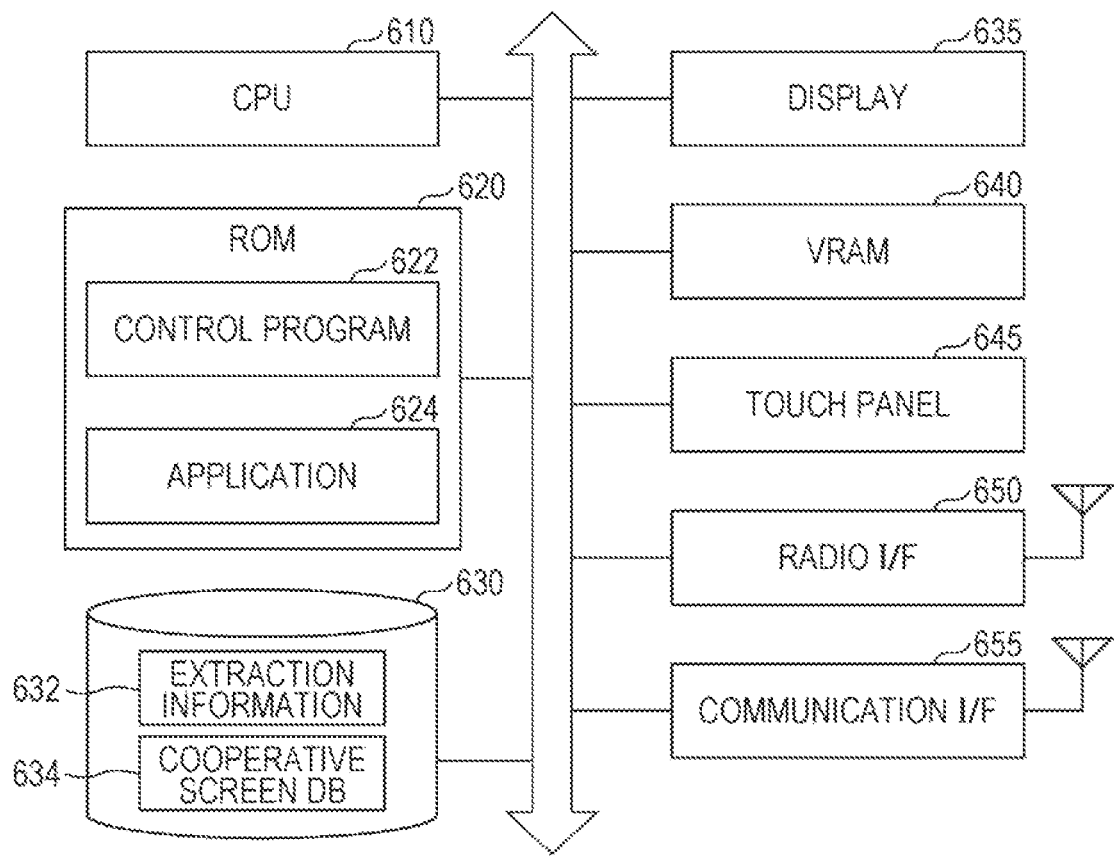
FIG. 6 is a block diagram of an exemplary configuration of the portable terminal according to the embodiment.

FIG. 6 is a block diagram of an exemplary configuration of the portable terminal 200 according to the embodiment. The portable terminal 200 includes a CPU 610, a ROM 620, a storage device 630, the display 635, a VRAM 640, a touch panel 645, the radio I/F 650, and a communication I/F 655.

The CPU 610 reads and executes a control program 622 stored in the ROM 620, to control the ops ration of the portable terminal 200. The ROM 620 stores the application 624 in addition to the control program 622. The execution of the application 624 by the CPU 610 allows the portable terminal 200 to cooperate with the image forming apparatus 100.

The storage device 630 includes a non-volatile memory. The storage device 630 stores extraction information 632 and a cooperative screen DB 634. The cooperative screen DB 634 stores data of a screen used for the execution of the application 624, namely, a screen for cooperating with the image forming apparatus 100 (hereinafter, also referred to as a "cooperative screen"). The extraction information 632 stores information for extracting, from the cooperative screen, the operating region including the operation-receiving region for receiving the operation by the user. The details of the extraction information 632 are to be given later in FIG. 7. The details of the cooperative screen DB 634 are to be given later in FIG. 8.

The VRAM 640 functions as a memory for retaining details to be displayed on the display 635. The touch panel 645 outputs information regarding a position (coordinates) selected by the user, to the CPU 610. The communication I/F 655 functions as an interface for connecting the network 400. The portable terminal 200 communicates with the server 300 through the communication I/F 655.

According to an aspect, the image forming apparatus 100 causes the image capturing apparatus 550 to generate the original data, in accordance with the instruction from the application 624 of the portable terminal 200. In this case, the image forming apparatus 100 transmits the generated original data to the portable terminal 200 through the radio I/F 555. The portable terminal 200 transmits the received original data to the server 300 (cloud computing) through the communication I/F 655. The portable terminal 200 is achieved by, for example, a smartphone, a tablet, a phablet, or a laptop computer.

(Extraction Information)

FIG. 7 illustrates an exemplary data structure of the extraction information 632. The extraction information 632 associates an element for screen IDs 710, an element for the present or absence of operation-receiving region 720, and an element for the range of operating region 730 with each other and retains the elements. The element for the screen IDs 710 is information for identifying a plurality of cooperative screens. The element for the presence or absence of operation-receiving region 720 indicates whether the corresponding cooperative screens respectively include the operation-receiving region for receiving the operation by the user.

The element for the range of operating region 730 includes coordinates indicating the range of the operating region on the touch panel 645 (the display 635). The element for the range of operating region 730 exemplarily includes the coordinates of two points. The information processing system 1 specifies a rectangle having the opposite angles formed with the two points, as the operating, region. In the example of FIG. 7, a screen ID of "001" indicates identification information regarding the screen 210 of FIG. 2. In this case, the information processing system 1 specifies, as the operating region 220, a rectangle having the opposite angles formed with coordinates of (X1, Y1) and coordinates of (X2, Y2) on the touch panel 645.

(Cooperative Screen DB)

FIG. 8 illustrates an exemplary data structure of the cooperative screen DB. The cooperative screen DB associates and retains an element for item IDs 810, an element for items 820, an element for the need of input 830, an element for image data 840, an element for ranges 850, and an element for histories 860 with each other. The element for items 820 includes the constituent elements of a cooperative screen. The element for item IDs 810 is information for identifying a plurality of items in the element for items 820. In the example of FIG. 8, the first three digits in the element for item IDs 810 correspond to the element for screen IDs 710. For example, an item corresponding to an item ID of "001A" is a constituent element of a cooperative screen having the screen ID of "001" in the element for screen IDs 710.

The element for the need of input 830 indicates whether the corresponding items are required to be input by the user. In the example of FIG. 8, the color mode of an item ID of "001C" (e.g., monochrome scanning or color scanning) is set such that the user needs to input. Meanwhile, the original type of an item ID of "001D" (e.g., text or photo) is set such that the user does not need to input). For example, in FIG. 2, when receiving a press of the return button (the item 225) without receiving the input of a setting for the color mode (the item 223), the CPU 610 of the portable terminal 200 displays, on the display 635, a message prompting the user to input the setting for the color mode. Meanwhile, when receiving the press of the item 225 (the return button) without receiving the input of a setting for the original type (the item 224), the CPU 610 scans the original copy in accordance with the condition set at defaults.

The element for image data 840 includes data for displaying an image for each item in the element for items 820. The element for ranges 850 indicates ranges in which the images of the corresponding items in the element for items 820 are displayed on the display 635. The element for ranges 850 retains the coordinates of two points, similarly to the element for the range of operating region 730 described in FIG. 7. The element for histories 860 indicates details set by the user in the past to the corresponding items in the element for items 820. In the example of FIG. 8, the element for histories 860 includes the respective histories for the item ID of "001A", an item ID of "001B", and the item ID of "001C", but includes no history for the item ID of "001D" (the original type).

First Embodiment (Functional Configuration)

Figure 9:
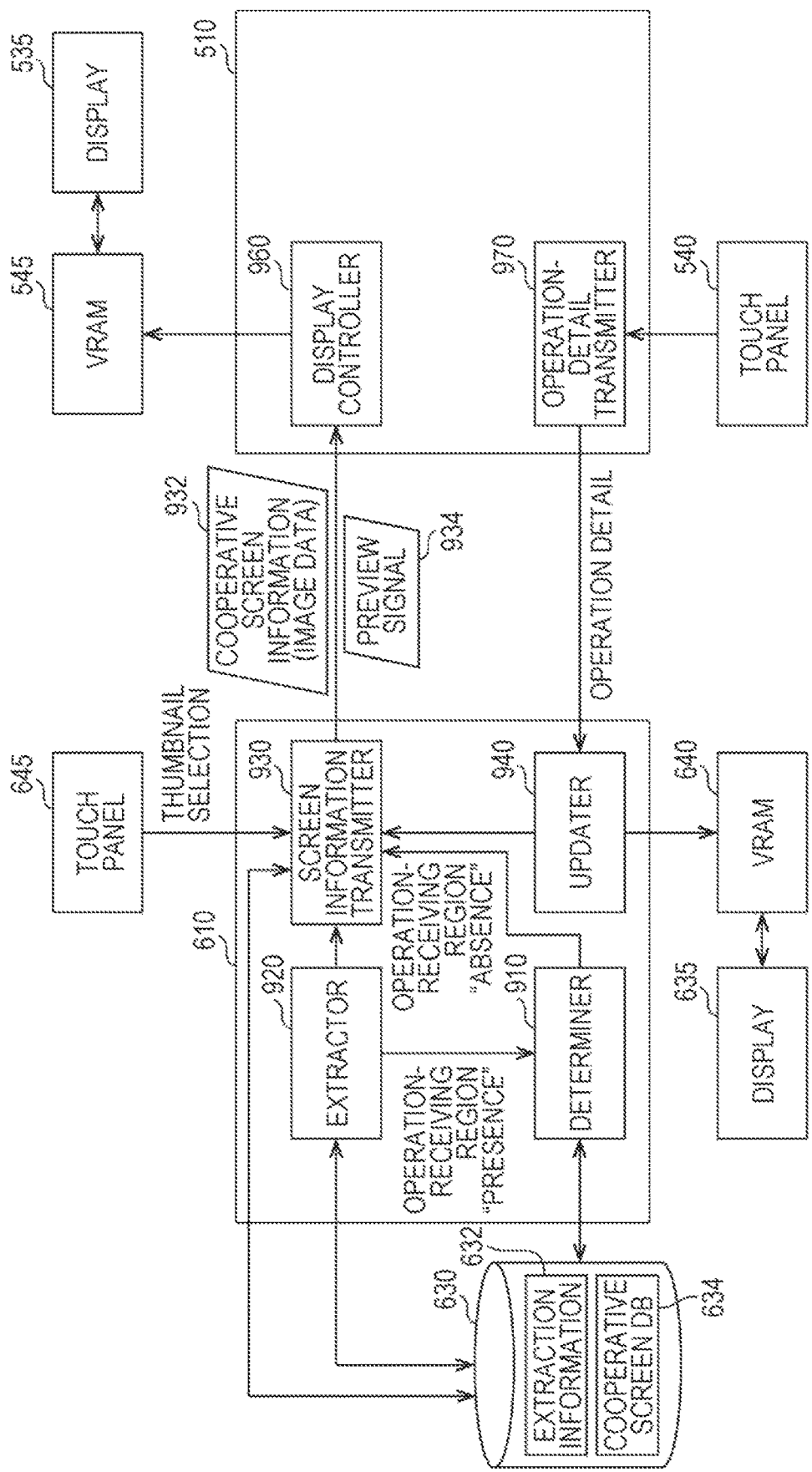
FIG. 9 is a block diagram for describing the functional configuration of an information processing system according to a first embodiment.

FIG. 9 is a block diagram for describing the functional configuration of an information processing system 1 according to a first embodiment. A CPU 610 of a portable terminal 200 executes an application 624 to function as a determiner 910, an extractor 920, a screen information transmitter 930, and an updater 940. A CPU 510 of an image forming apparatus 100 executes a control program to function as a display controller 960 and an operation-detail transmitter 970.

The determiner 910 determines whether a cooperative screen displayed on a display 635 includes an operation-receiving region for receiving the operation by a user. Specifically, the determiner 910 performs the determination on the basis of an element for the presence or absence of operation-receiving region 720 corresponding to the element for screen IDs 710 of the cooperative screen displayed on the display 635, with reference to extraction information 632. When determining that the operation-receiving region is present, the determiner 910 outputs the effect to the extractor 920. Meanwhile, when determining that no operation-receiving region is present, the determiner 910 outputs the effect to the screen information transmitter 930.

The extractor 920 extracts an operating region including the operation-receiving region, from the cooperative region, on the basis of the input from the determiner 910. Specifically, the extractor 920 accesses the extraction information 632 to acquire an element for the range of operating region 730 corresponding to the element for screen IDs 710 of the cooperative region, namely, coordinates information indicating the range of the operating region. The extractor 920 extracts data of an image corresponding to the operating region from the cooperative screen, in accordance with the coordinates information. The extractor 920 outputs the extracted image data to the screen information transmitter 930.

The screen information transmitter 930 transmits the image data input from the extractor 920 (the image data corresponding to the operating region) as cooperative screen information 932 to the image forming apparatus 100. When receiving a notification indicating that the cooperative screen includes no operation-receiving region, from the determiner 910, the screen information transmitter 930 transmits, to the image forming apparatus 100, the image data included in the cooperative screen in an element for image data 840 stored in a cooperative screen DB 634, as the cooperative screen information 932.

The display controller 960 of the image forming apparatus 100 develops the cooperative screen information 932 received from the portable terminal 200, into a predetermined region of a VRAM 545 (a predetermined region of a display 535 (a cooperative region 310 as in FIG. 4)). The display controller 960 exemplarily develops an image indicated with the cooperative screen information 932, into the predetermined region of the VRAM 545 such that the image has the largest size keeping the aspect ratio unchanged.

As described above, the operating region is displayed large on the predetermined region of the display 535. Therefore, the user can easily view the operating region. The information processing system 1 reduces a possibility that the user mishandles a cooperative operation to the application 624 on a touch panel 540.

When receiving an operation of the touch panel 540 corresponding to the image indicated with the cooperative screen information 932, the operation-detail transmitter 970 transmits the operation detail to the portable terminal 200. According to an aspect, the operation detail may include coordinates information on the touch panel 540. According to another aspect, the operation detail may include relative coordinates information to an operating position on the image indicated with the cooperative screen information 932 (an image 410 as in FIG. 4).

The updater 940 of the portable terminal 200 reflects the operation detail received from the operation-detail transmitter 970, in the application 624. The updater 940 updates the VRAM 640 in accordance with the application 624. As a result, details to be displayed on the display 635 are updated. The information processing system 1 repeatedly performs the processing in series. Specifically, the CPU 610, as the determiner 910, determines whether the operation-receiving region is included in the cooperative screen displayed on the display 635 after the updating.

(Processing of Displaying Preview)

The screen information transmitter 930 transmits a preview signal 934 to the image forming apparatus 100 instead of the cooperative screen information 932 when receiving an instruction for preview display on the basis of an input to the touch panel 645 (a user operation). In other words, when receiving the instruction for preview display, the screen information transmitter 930 prohibits the transmission of the cooperative screen information 932 to the image forming apparatus 100. The reason is that the image forming apparatus 100 retains, in a storage device 530, original data 532 corresponding, to an image to be preview-displayed on the portable terminal 200 storage device. The information processing system 1 prohibits the transmission of the cooperative screen information 932, to achieve a reduction in network traffic and a reduction in processing. According to an aspect, when a thumbnail of the original data displayed on the cooperative screen is touched, the screen information transmitter 930 determines that the instruction for preview display has been received.

The display controller 960 performs processing of displaying a preview screen on the display 535 or processing of displaying, on the display 535, a message prompting the user to perform a preview, in accordance with the input of the preview signal 934. Specific examples of the pieces of processing will be described with FIG. 2 and FIGS. 10 to 12.

Figure 10:
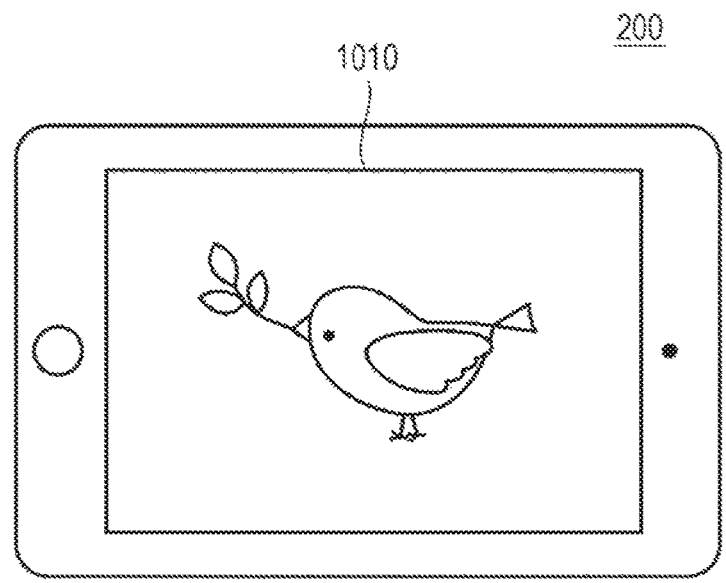
FIG. 10 is a view of a preview screen.

FIG. 10 illustrates the preview screen 1010 displayed on the portable terminal 200. The preview screen 1010 is a screen after reception of a touch operation corresponding to a preview region 230 on a screen 210 as in FIG. 2, namely, reception of a selection operation of the thumbnail image corresponding to the original data received from the image forming apparatus 100. The CPU 610, as the screen information transmitter 930, transmits the preview signal 934 to the image forming apparatus 100 in accordance with the user operation. According to an aspect, the CPU 510 of the image forming apparatus 100, as the display controller 960, displays a preview screen illustrated in FIG. 11 on the display 535 in accordance with the input of the preview signal 934.

Figure 11:
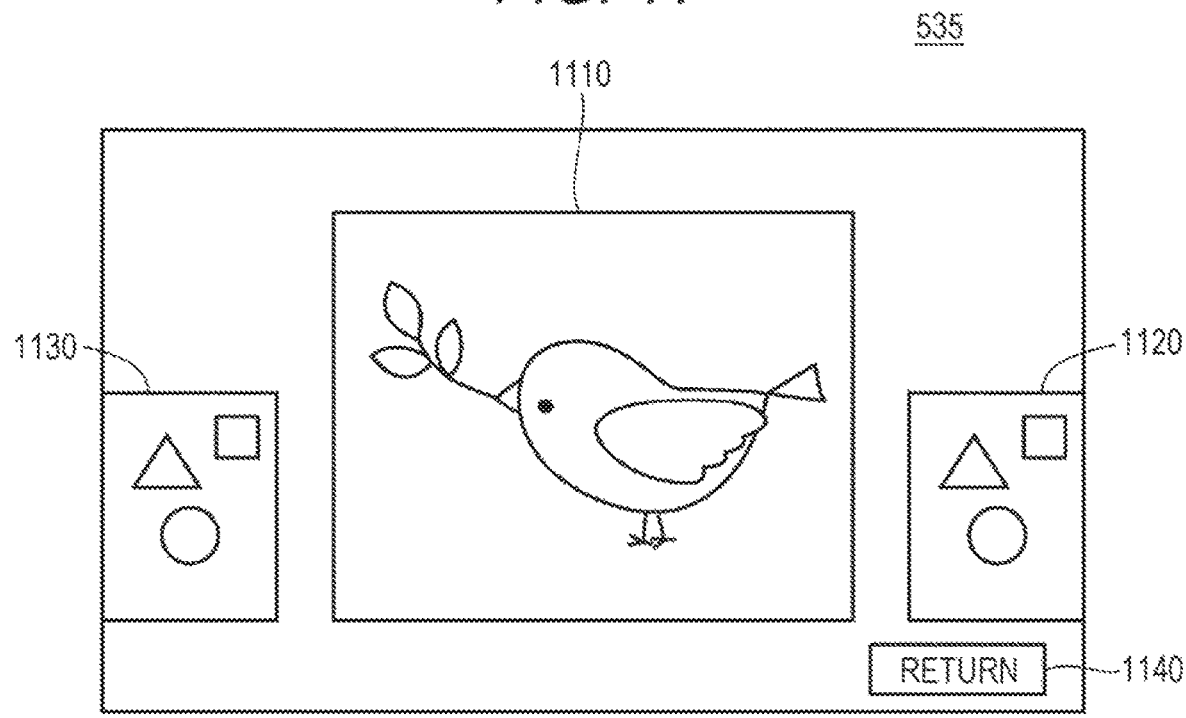
FIG. 11 is a diagram of an exemplary preview screen displayed on a display.

FIG. 11 illustrates an exemplary preview screen to be displayed on the display 535 of the image forming apparatus 100. The preview screen includes a preview image 1110 corresponding to the preview screen 1010 displayed on the portable terminal 200. The preview screen includes different preview images 1120 and 1130, and a button 1140 for finishing the preview screen. Note that, according to another aspect, the display controller 960 does not necessarily cause the preview image 1110, corresponding to the preview screen 1010 displayed on the portable terminal 200, to be included.

According to a still another aspect, the display controller 960 displays, on the display 535, a message prompting the user to perform the preview, instead of the preview screen illustrated in FIG. 11 in accordance with the input of the preview signal 934. After viewing the message, the user presses a button 120 as illustrated in FIG. 4. The display controller 960 removes the cooperative region 310 from the display 535 in accordance with the press of the button 420. At this time, the display controller 960 may control the cooperative region 310 to slide gradually with animation.

Figure 12:
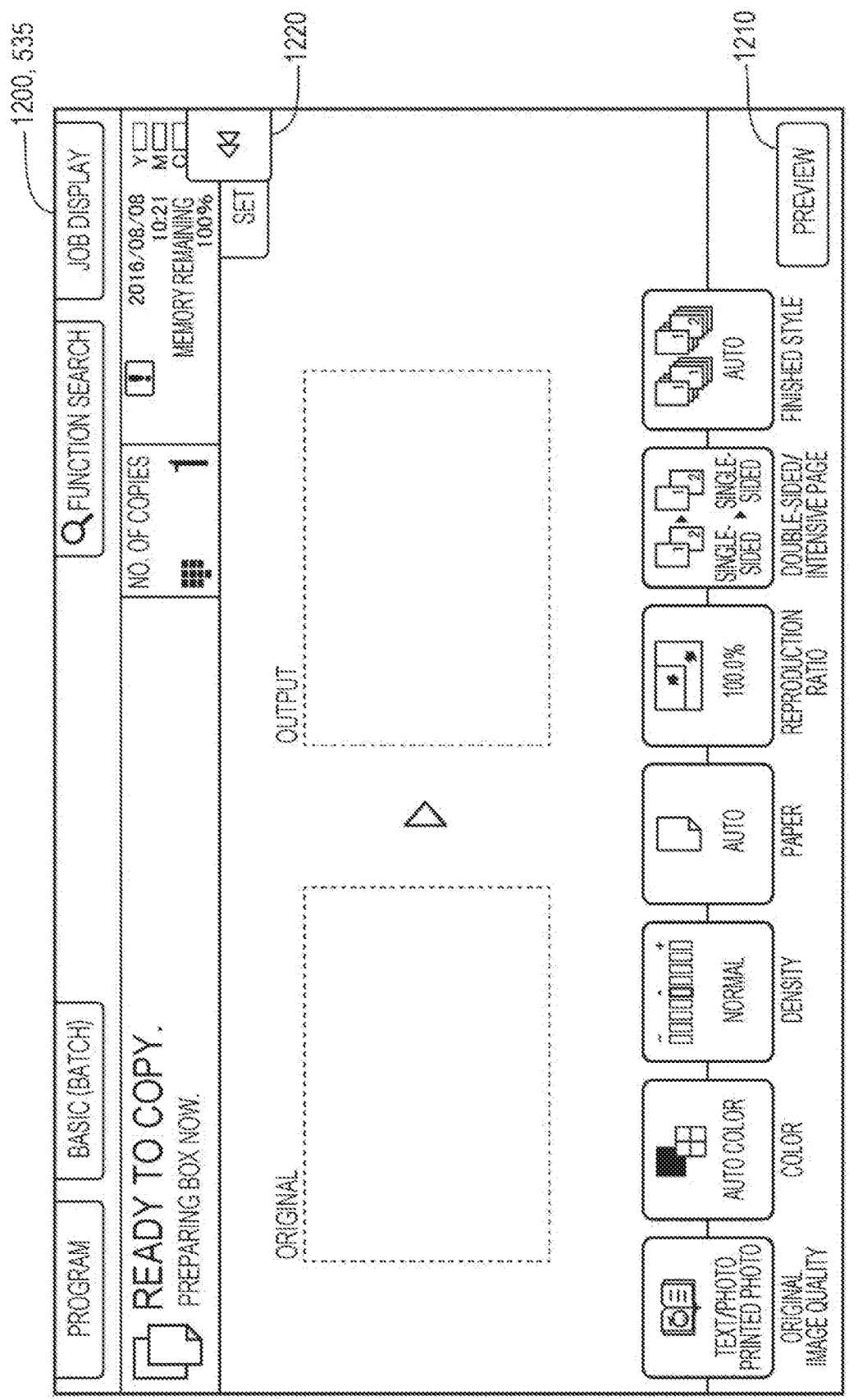
FIG. 12 is a diagram of a screen displayed, on the display after a press of a button.

FIG. 12 illustrates a screen 1200 to be displayed on the display 535 after the press of the button 420. The screen 1200 includes a preview button 1210 and a button 1220. The display controller 960 displays the preview screen illustrated in FIG. 11, in accordance with a press of the preview button 1210. The display controller 960 displays the cooperative region 310 as illustrated in FIG. 4 again, in accordance with a press of the preview button 1220.

The image forming apparatus 100 is capable of controlling the cooperative region 310 to be or not to be displayed, as described above. According to an aspect, the image forming apparatus 100 displays a scanning setting screen illustrated in FIG. 4 (the image 410) on the cooperative region 310. When receiving a press of an item 225 (a return button), the image forming apparatus 100 starts causing an image capturing apparatus 550 to capture the original copy. When a jam occurs during capturing the original copy, the image forming apparatus 100 displays an instruction for releasing the jam, on the display 535. However, there is a possibility that the user cannot view a part of the instruction due to the cooperative region 310. In that case, the user performs an operation for controlling the cooperative region 310 not to be displayed similarly to the above, so that the user can view the instruction for releasing the jam.

Figure 13:
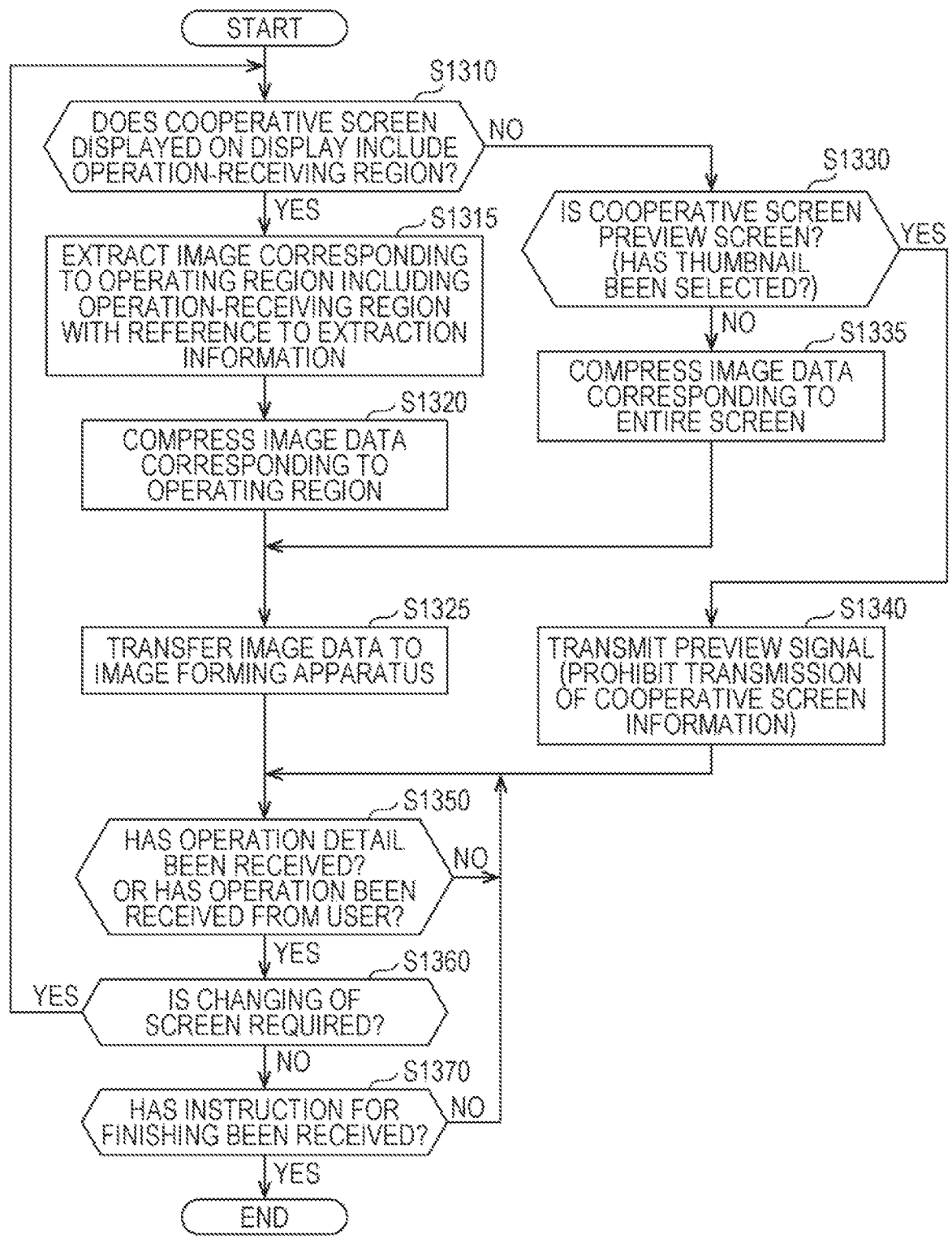
FIG. 13 is a flowchart of processing in a portable terminal according to the first embodiment.

FIG. 13 is a flowchart of processing in the portable terminal 200 according to the first embodiment. The CPU 610 executes the application 624 stored in a ROM 620, to achieve the processing illustrated in FIG. 13. According to another aspect, the entirety or part of the processing may be performed by a circuit element or different hardware.

At step S1310, the CPU 610 determines whether the cooperative screen displayed on the display 635 includes the operation-receiving region. When the CPU 610 determines that the operation-receiving region is included (YES at step S1310), the processing proceeds to step S1315. Meanwhile, when the CPU 610 determined that no operation-receiving region is included (NO at step S1310), the processing proceeds to step S1330.

At step S1315, the CPU 610 extracts the image corresponding to the operating region including the operation-receiving region, with reference to the extraction information 632 stored in a storage device 630. At step S1320, the CPU 610 compresses the extracted image data in accordance with a known format. At step S1325, the CPU 610 transfers the compressed image data to the image forming apparatus 100. At this time, the CPU 610 additionally transmits information indicating that the image data corresponds to the operating region, to the image forming apparatus 100.

At Step S1330, the CPU 610 determines whether the cooperative screen is the preview screen. According to an aspect, when the thumbnail image corresponding to the original data is selected on the touch panel 645, the CPU 610 determines that the cooperative screen is the preview screen. When the CPU 610 determines that the cooperative screen is the preview screen (YES at step S1330), the processing proceeds to step S1340. Meanwhile, when the CPU 610 determines that the cooperative screen is not the preview screen (NO at step S1330), the processing proceeds to step S1335.

At step S1335, the CPU 610 compresses image data corresponding to the entire screen of the cooperative screen. At step S1325, the CPU 610 transfers the compressed image data to the image forming apparatus 100. At this time, the CPU 610 additionally transmits information indicating that the image data corresponds to the entire screen, to the image forming apparatus 100. At step S1340, the CPU 610 transfers the preview signal to the image forming apparatus 100. That is, the CPU 610 prohibits the transmission of the image data of the cooperative screen.

At step S1350, the CPU 610 determines whether the operation detail (the coordinates information) corresponding to the cooperative screen has been received from the image forming apparatus 100 or whether the user operation has been received through the touch panel 645. When the CPU 610 determines that the operation detail has been received from the image forming apparatus 100 or that the user operation has been received (YES at step S1350), the processing proceeds to step S1360. If not (NO at step S1350), the CPU 610 causes the processing to go back to step S1350.

At step S1360, the CPU 610 determines whether the operation detail received from the image forming apparatus 100 or the user operation through the touch panel 645 is an instruction for changing the screen displayed on the display 635. When the CPU 610 determines that the operation detail or the user operation is the instruction for changing the screen (YES at step S1360), the processing goes back to step S1310. Meanwhile, when the CPU 610 determines that the operation detail or the user operation is not the instruction for changing the screen (NO at step S1360), the processing proceeds to step S1370.

At step S1370, the CPU 610 determines whether the operation detail received from the image forming apparatus 100 or the user operation through the touch panel 645 is an instruction for finishing. When the CPU 610 determines that the operation detail or the user operation is the instruction for finishing (YES at step S1370), the processing in series finishes. Meanwhile, when the CPU 610 determines that the operation detail or the user operation is not the instruction for finishing (NO at S1370), the processing goes back to step S1350.

Figure 14:
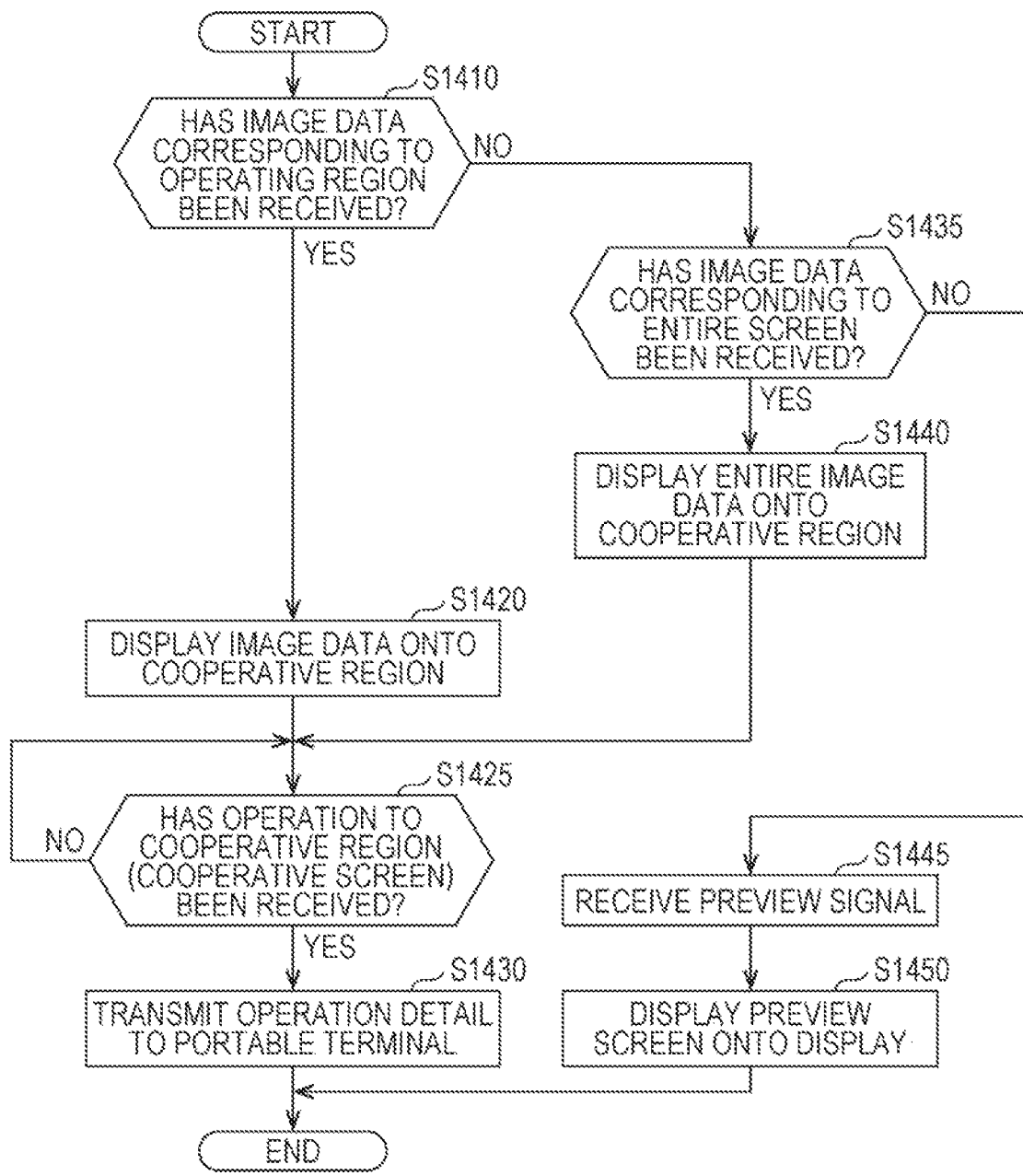
FIG. 14 is a flowchart of processing in an image forming apparatus according to the first embodiment.

FIG. 14 is a flowchart of processing in the image forming apparatus 100 according to the first embodiment, The CPU 510 executes a control program stored in a ROM 520, to achieve the processing illustrated in FIG. 14. The processing causes the image forming apparatus 100 to cooperate with the portable terminal 200, and starts with the reception of the image data or the preview signal from the portable terminal 200. According to another aspect, the entirety or part of the processing may be performed by a circuit element or different hardware.

At step S1410, the CPU 510 determines whether the image data corresponding to the operating region has been received from the portable terminal 200. When the CPU 510 determines that the image data corresponding to the operating region has been received (YES at step S1410), the processing proceeds to step S1420. Meanwhile, when the CPU 510 determined that the image data corresponding to the operating region has not been received (NO at step S1410), the processing proceeds to step S1435.

At step S1420, the CPU 510 displays the image corresponding to the operating region, on the cooperative region 310. At this time, the CPU 510 displays the image corresponding to the operating region, on the cooperative region 310 such that the image has the largest size, while keeping the aspect ratio unchanged.

At step S1425, the CPU 510 determines whether the user operation to the cooperative region 310 (the input to the touch panel 540) has been received. When determining that the user operation to the cooperative region 310 has been received (YES at step S1425), the CPU 510 transmits the operation detail (the coordinates information) of the user operation, to the portable terminal 200 (step S1430).

At step S1435, the CPU 510 determines whether the image data corresponding to the entire screen of the cooperative screen has been received from the portable terminal 200. When determining that the image data corresponding to the entire screen has been received (YES at step S1435), the CPU 510 displays the entire image of the cooperative screen on the cooperative region 310 (step S1440). Then, the CPU 510 causes the processing to proceed to step S1425.

At step S1445, the CPU 510 determines that the preview signal has been received. At step S1450, the CPU 510 displays the preview screen on the display 535. As another aspect, the CPU 510 displays the message prompting the user to perform the preview. Then, the CPU 510 finishes the processing in series.

As described above, the information processing system 1 allows the operating region requiring the user operation to be displayed large on the display 535. Therefore, the user can easily view the operating region. The information processing system 1 reduces the possibility that the user mishandles the cooperative operation to the application 624 on the touch panel 540.

Second Embodiment

According to the first embodiment, the portable terminal 200 extracts the image corresponding to the operating region from the cooperative screen. According to a second embodiment, an image forming apparatus 100 extracts an image corresponding to an operating region from a cooperative screen.

Figure 15:
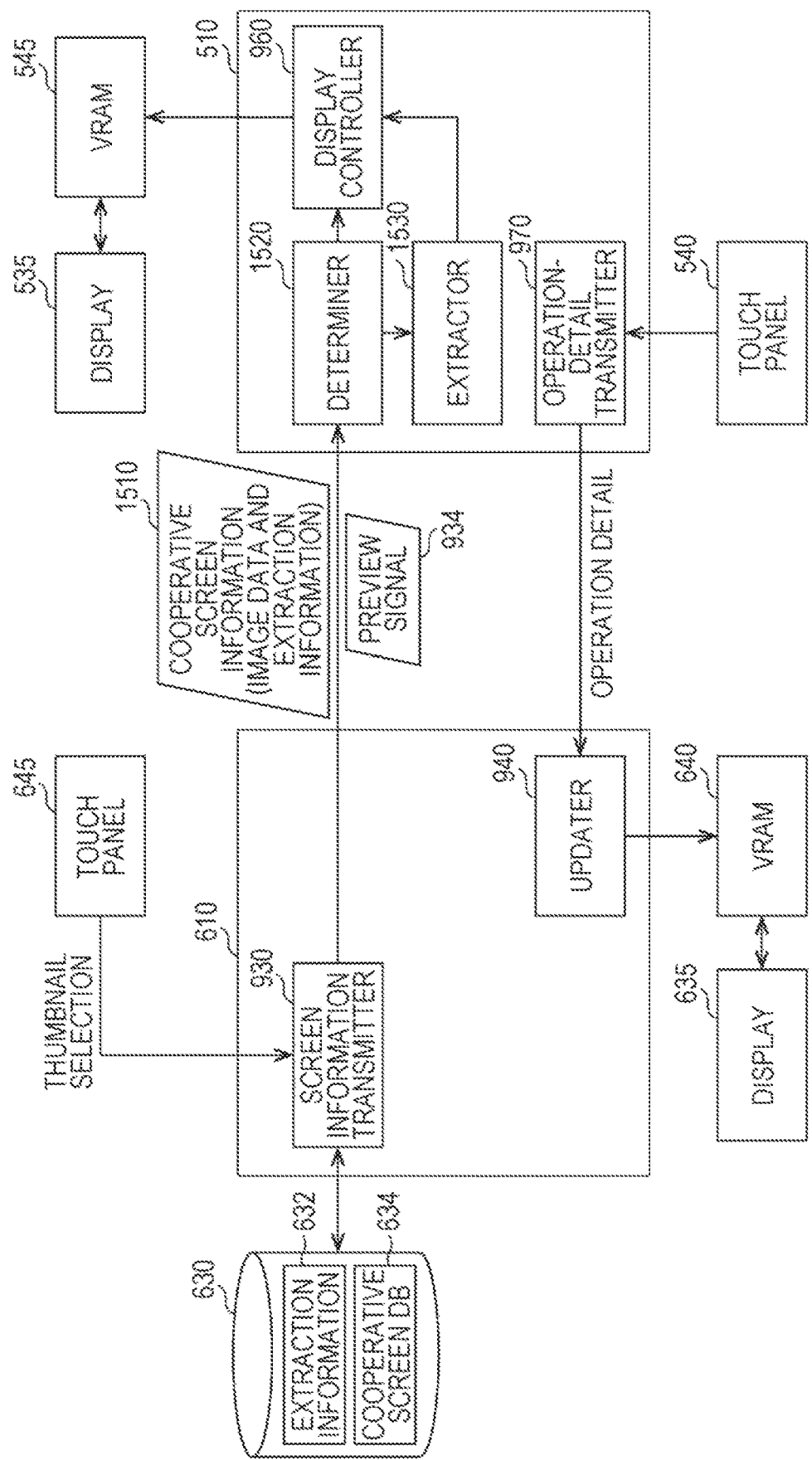
FIG. 15 is a block diagram for describing the functional configuration of an information processing system according to a second embodiment.

FIG. 15 is a block diagram for describing the functional configuration of an information processing system 1 according to the second embodiment. Note that, functions from the functions illustrated in FIG. 15 that are the same as functions of FIG. 9 are denoted with the same reference signs. Therefore, the descriptions of the functions will not be repeated.

The functional configuration of a CPU 610 of a portable terminal 200 is different from the functional configuration of the CPU 610 according to the first embodiment in that a determiner 910 and an extractor 920 are not included. The functional configuration of a CPU 510 of the image forming apparatus 100 is different from the functional configuration of the CPU 510 according to the first embodiment in that a determiner 1520 and an extractor 1530 are included.

A screen information transmitter 930 of the portable terminal 200 transmits, to the image forming apparatus 100, image data of a cooperative screen displayed on a display 635 and extraction information 632 corresponding to the cooperative screen, as cooperative screen information 1510. The extraction information 632 includes an element for the present or absence of operation-receiving region 720 and an element for the range of operating region 730, corresponding to the cooperative region.

The determiner 1520 determines whether the received cooperative screen includes an operation-receiving region for receiving the operation by a user. Specifically, the determiner 1520 performs the determination on the basis of the element for operation-receiving region 720 included in the received extraction information 632. When determining that the operation-receiving region is present, the determiner 1520 outputs the effect to the extractor 1530. Meanwhile, when determining that no operation-receiving regions present, the determiner 1520 outputs the effect to a display controller 960. When receiving, from the determiner 1520, the notification indicating that no operation receiving region is present, the display controller 960 develops the image data of the cooperative screen received from the portable terminal 200, into a VRAM 545. This arrangement allows the cooperative screen displayed on the portable terminal 200, to be displayed on a cooperative region 310.

The extractor 1530 extracts the operating region including the operation-receiving region, from the cooperative screen, on the basis of the input from the determiner 1520. Specifically, the extractor 1530 extracts data of an image corresponding to the operating region from the cooperative screen, in accordance with the element for the range of operating region 730 in the received extraction information 632. The extractor 1530 outputs the extracted image data to the display controller 960. The display controller 960 develops the input image data into the VRAM 545. This arrangement allows the image corresponding to the operating region to be displayed on the cooperative region 310.

Figure 16:
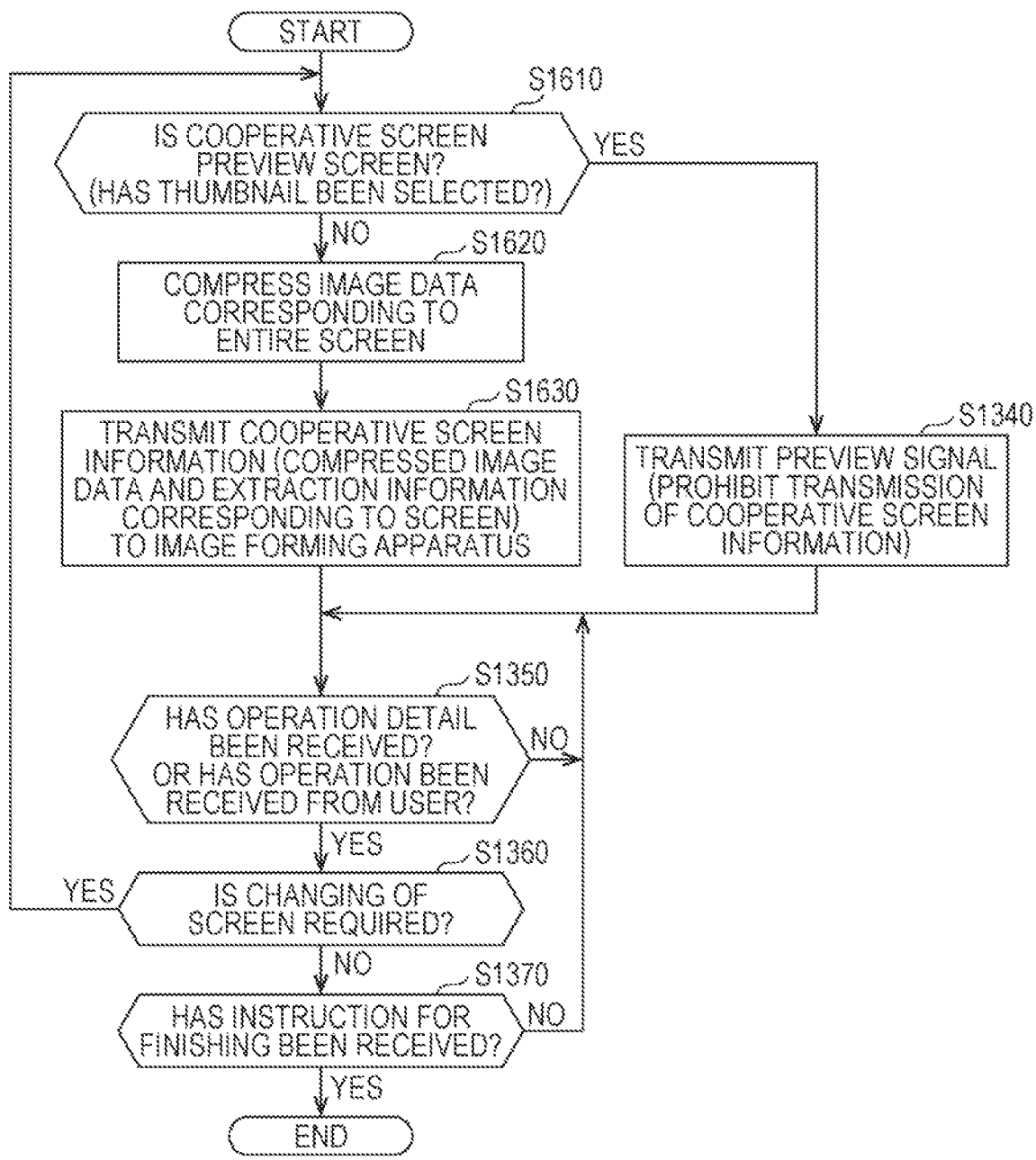
FIG. 16 is a flowchart of processing in a portable terminal according to the second embodiment.

FIG. 16 is a flowchart of processing in the portable terminal 200 according to the second embodiment. Note that pieces of processing from the processing illustrated in FIG. 16 that are the same as pieces of processing of FIG. 13 are denoted with the same reference signs. Therefore, the descriptions of the pieces of processing will not be repeated.

At step S1610, the CPU 610 determines whether the cooperative screen displayed on the display 635 is a preview screen. When the CPU 610 determines that the cooperative screen is the preview screen (YES at step S1610), the processing proceeds to step S1340. Meanwhile, when the CPU 610 determines that the cooperative screen is not the preview screen (NO) at step S1610), the processing proceeds to step S1620.

At step S1620, the CPU 610 compresses image data corresponding to the entire screen of the cooperative screen. At step S1630, the CPU 610 transmits, to the image forming apparatus 100, the compressed image data and the extraction information 632 corresponding to the cooperative screen, as the cooperative screen information.

Figure 17:
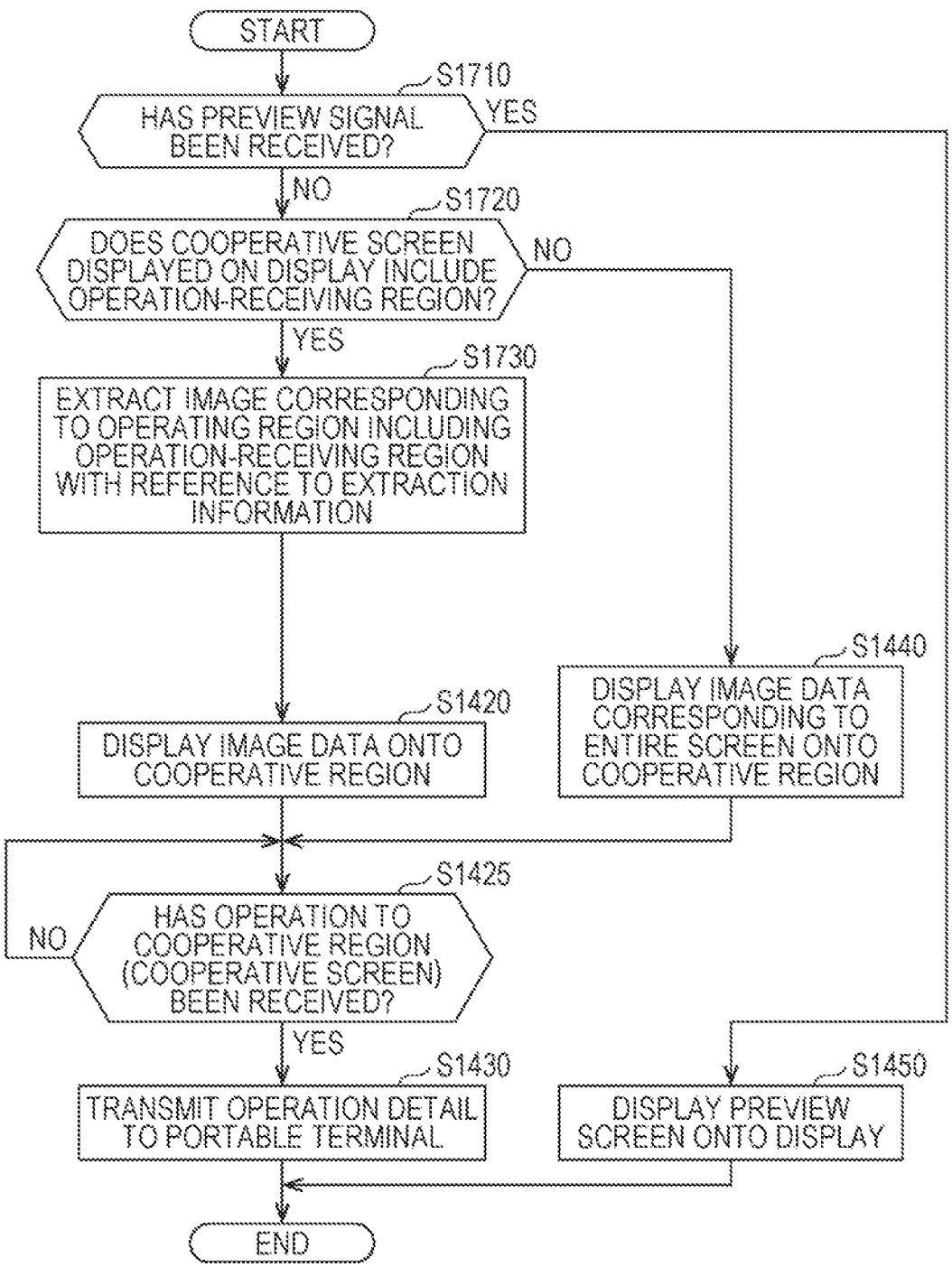
FIG. 17 is a flowchart of processing in an image forming apparatus according to the second embodiment.

FIG. 17 is a flowchart of processing in the image forming apparatus 100 according to the second embodiment. Note that pieces of processing in the processing illustrated in FIG. 17 that are the same as pieces of processing of FIG. 14 are denoted with the same reference signs. Therefore, the descriptions of the pieces of processing will not be repeated.

At step S1710, the CPU 510 determines whether a preview signal has been received from the portable terminal 200. When the CPU 510 determines that the preview signal has been received (YES at step S1710), the processing proceeds to step S1450. Meanwhile, when the CPU 510 determines that no preview signal has been received (NO at step S1710), the processing proceeds to step S1720.

At step S1720, the CPU 510 determines whether the cooperative screen received from the portable terminal 200 includes the operation-receiving region. When the CPU 510 determines that the operation-receiving region is included (YES at step S1720), the processing proceeds to step S1730. Meanwhile, when the CPU 510 determines that no operation-receiving region is included (NO at step S1720), the processing proceeds to step S1440.

At step S1730, the CPU 510 extracts the image corresponding to the operating region including the operation-receiving region, with reference to the received extraction information 632.

The information processing system 1 according to the second embodiment allows the operating region requiring the user operation to be displayed large on a display 535, similarly to the information processing system 1 according to the first embodiment. The information processing system 1 according to the second embodiment, reduces the processing burden of the portable terminal 200 highly frequently used by the user.

Third Embodiment

As described above, the image forming apparatus 100 displays the cooperative screen on the previously determined cooperative region 310 on the display 535. When the cooperative screen is displayed on the cooperative region 310 while keeping the aspect ratio unchanged, the cooperative region 310 and the cooperative screen (the image 410) are in some cases in disagreement in size as in FIG. 4. Meanwhile, when the cooperative screen is displayed on the entire region of the cooperative region 310, not keeping the aspect ratio unchanged, the cooperative screen is displayed unnaturally.

Thus, a display controller 960 of an image forming apparatus 100 according to a third embodiment, determines the size of a cooperative region, on the basis of the size (aspect ratio) of a cooperative screen (a screen corresponding to an operating region or the entire screen). A specific example of the processing will be described with FIG. 18.

Figure 18:
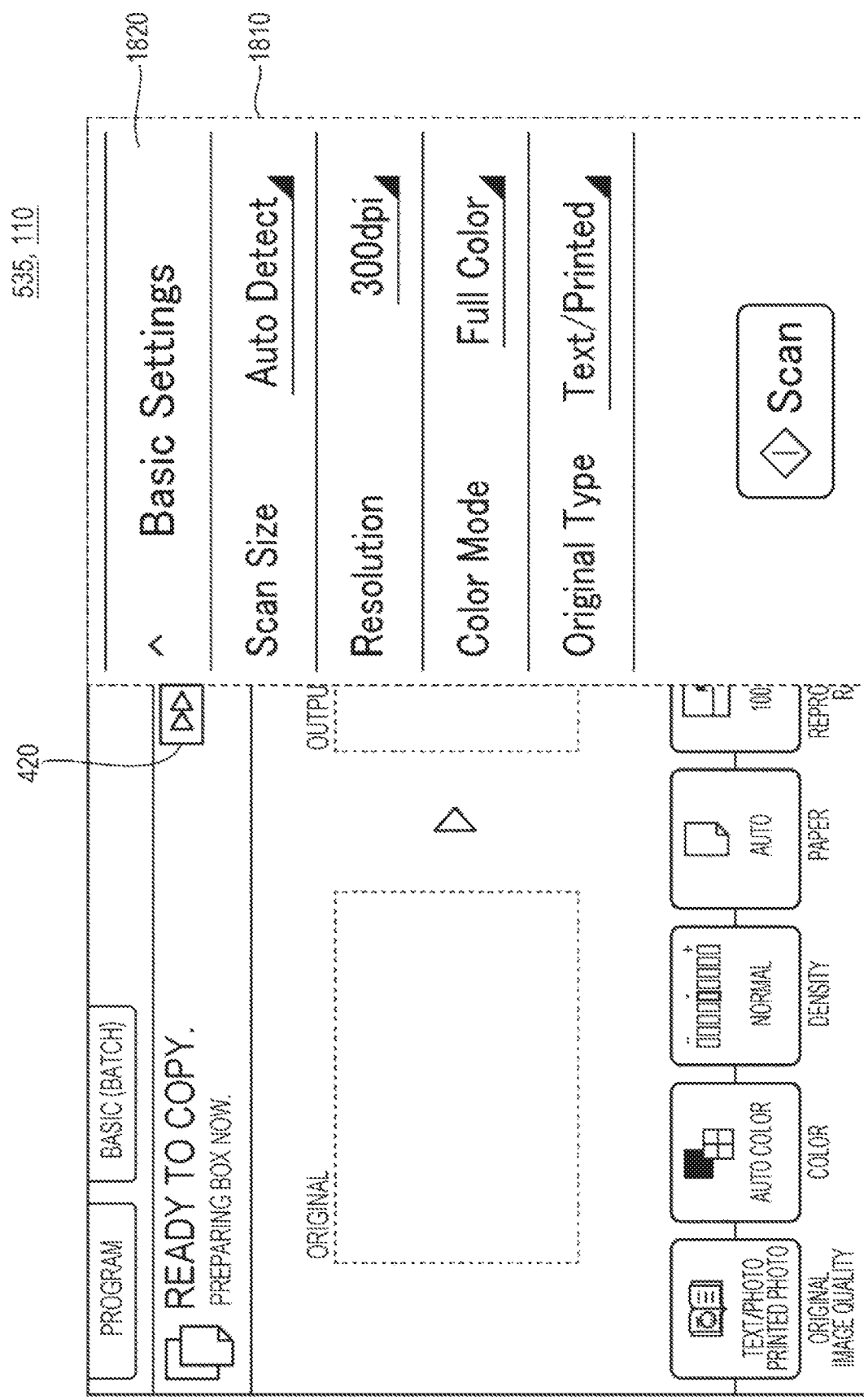
FIG. 18 is a diagram for describing processing of sharing a screen of a portable terminal with an image forming apparatus according to a third embodiment.

FIG. 18 is a diagram for describing processing of sharing a screen of a portable terminal 200 with the image forming apparatus 100 according to the third embodiment. The display controller 960 sets a region in which the cooperative screen received from the portable terminal 200 can be displayed on a display 535, while keeping the aspect ratio unchanged, to the cooperative region 1810. The display controller 960 displays the cooperative screen 1820 on the cooperative region 1810. That is, the display controller 960 performs the setting such that the cooperative region 1810 and the cooperative screen 1820 are the same in size. With this arrangement, the display controller 960 according to the third embodiment can minimize the portion covered by the cooperative screen on the display 535, while keeping the size of the cooperative screen (the screen corresponding to the operating region). Therefore, when desirably viewing an operating screen of the image forming apparatus 100 instead of the cooperative screen, a user easily views the details thereof.

Fourth Embodiment

The information processing system 1 according to each of the first and second embodiments extracts the operating region including the entire operation-receiving region included in the cooperative screen. An information processing system 1 according to a fourth embodiment extracts a part of an operating region on the basis of the histories of user operation.

Figure 19:
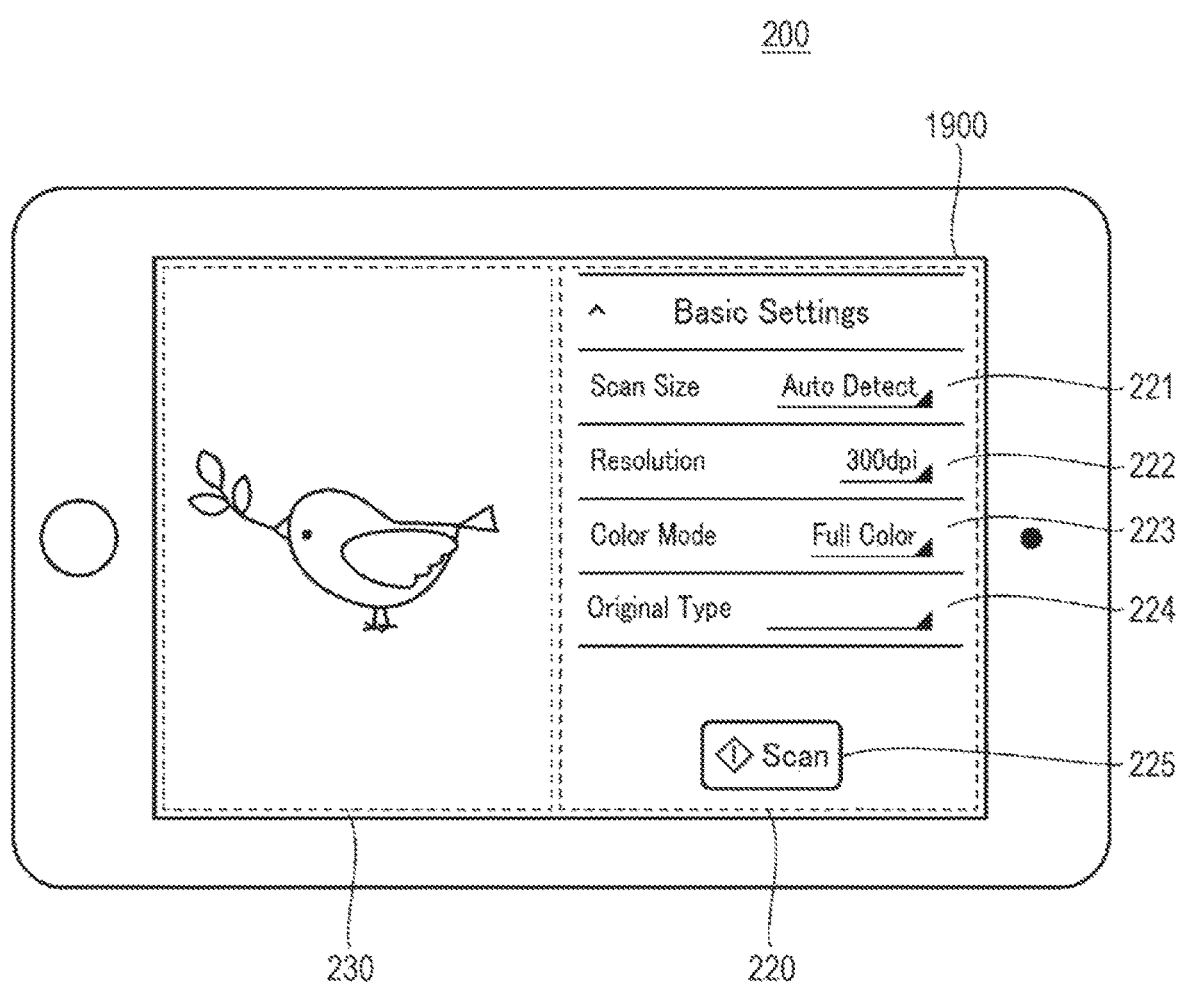
FIG. 19 is a view of a screen displayed, on a display of the portable terminal.

FIG. 19 illustrates a screen 1900 displayed on a display of a portable terminal 200. The screen 1900 has a screen ID of "001". A CPU 610 of the portable terminal 200 reflects details input by the user in the past, in items 221 to 223 with reference to an element for histories 860 in a cooperative screen DB 634 as described in FIG. 8. Meanwhile, the CPU 610 displays with an item. 224 blank since no history is present for an item of "original type" in the element for histories 860.

The CPU 610, as an extractor 920, further extracts the part of the operating region, on the basis of the histories of user operation. As an example, the extractor 920 extracts only items, each of which having a history in the element for histories 860, from the items (in an operation-receiving region) included in the cooperative screen having the screen ID of "001". In the example of FIG. 8, no history is present for the item of "original type" in the element for histories 860. Therefore, the extractor 920 extracts the items 221 to 223 and an item 225 from the items included in the cooperative screen having the screen ID of "001". More specifically, the extractor 920 extracts the items, on the basis of an element for ranges 850. This extraction method is achieved by the method of extracting the operating region. The portable terminal 200 transmits data of an image corresponding to the part of the operating region that has been extracted, to an image forming apparatus 100. The image forming apparatus 100 displays a screen illustrated in FIG. 20, on a display 535, on the basis of the data.

FIG. 20 is a diagram for describing processing of sharing the screen of the portable terminal 200 with the image forming apparatus 100 of the information processing system 1 according to the fourth embodiment. The items 221 to 223 and the item 225 are displayed on a cooperative screen 2020 displayed on a cooperative region 2010. This configuration allows each of the items displayed on the cooperative screen 2020 to be larger in size than each of the items displayed on the cooperative screen 1820 of FIG. 18. Therefore, the user views and operates the items easier. The user can view only the items operated by the user in the past, from the cooperative screen displayed on the display 635 of the portable terminal 200, again and can perform setting.

According to another aspect, the extractor 920 may extract the items (in the operation receiving region), each of which having the history of user operation, within a predetermined period. Furthermore, according to a still another aspect, the extractor 920 may extract only the item having no history of user operation.

According to a still another aspect, the extractor 920 may extract the items set to "not required" in an element for the need of input 830. According to a still another aspect, the extractor 920 may extract the item set to "not required" in the element for the need of input 830, the item having no history in the element for histories 860.

[Other Configurations]

According to each of the embodiments, the information processing system 1 extracts, from the cooperative screen displayed on the portable terminal 200, the image corresponding to the operating region including the operation-receiving region for receiving the operation by the user. As another aspect, the information processing system 1 may extract an image corresponding to a setting region including a setting-receiving region for receiving, a setting for the image forming apparatus 100, from the cooperative screen displayed on the portable terminal 200, to display the image on the display 535 of the image forming apparatus 100. For example, the setting-receiving region corresponds to the items 221 to 224 illustrated in FIG. 2.

In the exemplifications, the various functions and the various types of processing are achieved by the CPU 510 of the image forming apparatus 100 or the CPU 610 of the portable terminal 200, but are not limited to this. The various functions are implemented with a semiconductor integrated circuit having at least one processor, at least one application specific integrated circuit (ASIC), at least one digital signal processor (DSP), at least one field programmable gate array (FPGA), and/or a circuit having a different computing function.

Each of the circuits reads one command or more from at least one material readable medium, to achieve the various functions and the various types of processing.

The medium has a mode including a magnetic medium (e.g., a hard disk), an optical medium (e.g., a compact disc (CD) or a DVD), or an arbitrary type of memory, such as a volatile memory or a non-volatile memory, but is not limited to the mode.

Examples of the volatile memory include a dynamic random access memory (DRAM) and a static random access memory (SRAM). Examples of the non-volatile memory include a ROM and an NVRAM. A semiconductor memory together with at least one processor is included in a part of a semiconductor circuit.

Although embodiments of the present invention have been described and illustrated in detail, the disclosed embodiments are made for purposes of illustration and example only and not limitation. The scope of the present invention should be interpreted by terms of the appended claims. The scope of the present invention includes the meaning of equivalents of the scope of the claims and all alternations in the scope thereof.

What is claimed is:

1. An information processing system including an image forming apparatus for forming an image onto a recording medium and a portable terminal that is allowed to communicate with the image forming apparatus, the information processing system comprising
a hardware processor that:
determines whether a cooperative screen for cooperating with the image forming apparatus includes, in addition to an image preview, an operation-receiving region for receiving an operation by a user, the cooperative screen being displayed on a display of the portable terminal;
extracts, from the cooperative screen, an image corresponding to an operating region including the operation-receiving region, without the image preview, when the hardware processor determines that the cooperative screen includes the operation-receiving region; and
displays, on a display of the image forming apparatus, simultaneously settings relating to functions of the image forming apparatus and the image corresponding to the operating region extracted by the hardware processor.

2. The information processing system according to claim 1, wherein
the hardware processor displays the cooperative screen on the display of the image forming apparatus when the hardware processor determines that the cooperative screen does not include the operation-receiving region.

3. The information processing system according to claim 1, wherein
the image forming apparatus transmits information indicating an operation detail to the portable terminal when the operation by the user to the cooperative screen displayed on the display of the image forming apparatus is received.

4. The information processing system according to claim 1, wherein
the portable terminal includes a storage device that associates the cooperative screen and coordinates information with each other and retain the cooperative screen and the coordinates information, the coordinates information indicating a range of the operating region on the cooperative screen, and
the hardware processor extracts the operating region from the cooperative screen based on the coordinates information.

5. The information processing system according to claim 4, wherein
the portable terminal transmits, to the image forming apparatus, the coordinates information associated with the cooperative screen displayed on the display of the portable terminal, and
the image forming apparatus includes the hardware processor.

6. The information processing system according to claim 4, wherein
the portable terminal includes the hardware processor, and transmits, to the image forming apparatus, image data corresponding to the operating region extracted by the hardware processor.

7. The information processing system according to claim 1, wherein
the portable terminal includes a hardware processor that transmits, to the image forming apparatus, information regarding the cooperative screen displayed on the display of the portable terminal, and
the image forming apparatus includes the hardware processor that extracts the operating region from the cooperative screen based on the information regarding the cooperative screen received from the portable terminal.

8. The information processing system according to claim 7, wherein
the image forming apparatus includes an image capturing apparatus that captures an original copy, and transmits original data generated by the image capturing apparatus to the portable terminal when the image capturing apparatus captures the original copy in accordance with the operation by the user to the cooperative screen displayed on the display of the image forming apparatus, and the hardware processor prohibits the transmission of the information regarding the cooperative screen to the image forming apparatus when a thumbnail corresponding to the original data is selected.

9. The information processing system according to claim 8, wherein
the hardware processor transmits, when the thumbnail corresponding to the original data is selected, a preview signal indicating the selection of the thumbnail to the image forming apparatus, and
the hardware processor performs processing of displaying, on the display of the image forming apparatus, a preview screen on the display of the image forming apparatus or processing of displaying a message prompting performance of a preview, in accordance with the preview signal received by the image forming apparatus.

10. The information processing system according to claim 1, wherein
the portable terminal includes a storage device that stores a history of user operation to the cooperative screen, and
the hardware processor extracts a part of the operating region based on the history of user operation, when the hardware processor determines that the cooperative screen includes the operation-receiving region.

11. The information processing system according to claim 1, wherein
the hardware processor determines based on a size of the operating region, a size of the image corresponding to the operating region, the image being to be displayed on the display of the image forming apparatus.

12. The information processing system according to claim 1, wherein
the operation-receiving region is an item of settings relating to functions of the image forming apparatus.

13. The information processing system according to claim 1, wherein
the hardware processor extracts the image corresponding to the operation-receiving region from the cooperative screen when the hardware processor determines that the cooperative screen includes the operation-receiving region and a preview region.

14. The information processing system according to claim 1, wherein
the information processing system includes an image forming apparatus for printing an image onto a recording medium.

15. A method of controlling an information processing system including an image forming apparatus for forming an image onto a recording medium and a portable terminal that is allowed to communicate with the image forming apparatus, the method comprising:
determining whether a cooperative screen for cooperating with the image forming apparatus includes, in addition to an image preview, an operation-receiving region for receiving an operation by a user, the cooperative screen being displayed on a display of the portable terminal;
extracting, from the cooperative screen, an image corresponding to an operating region including the operation-receiving region, without the image preview, when the determining determines that the cooperative screen includes the operation-receiving region; and
displaying, on a display of the image forming apparatus, simultaneously settings relating to functions of the image forming apparatus and the image corresponding to the operating region extracted by the extracting.

16. The method according to claim 15, wherein
the operation-receiving region is an item of settings relating to functions of the image forming apparatus.

17. The method according to claim 15, wherein
the extracting comprises extracting the image corresponding to the operation-receiving region from the cooperative screen when the determining determines that the cooperative screen includes the operation-receiving region and a preview region.

18. A portable terminal that is allowed to communicate with an image forming apparatus for printing an image onto a recording medium, the portable terminal comprising:
a display; and
a control apparatus that controls a cooperative operation with the image forming apparatus, wherein
the control apparatus includes
a hardware processor that:
determines whether a cooperative screen for cooperating with the image forming apparatus includes, in addition to an image preview, an operation-receiving region for receiving an operation by a user, the cooperative screen being displayed on the display;
extracts, from the cooperative screen, an image corresponding to an operating region including the operation-receiving region, without the image preview, when the hardware processor determines that the cooperative screen includes the operation-receiving region; and
transmits, to the image forming apparatus, the image corresponding to the operating region extracted by the hardware processor.

19. The portable terminal according to claim 18, wherein
the operation-receiving region is an item of settings relating to functions of the image forming apparatus.

20. The portable terminal according to claim 18, wherein
the hardware processor extracts the image corresponding to the operation-receiving region from the cooperative screen when the hardware processor determines that the cooperative screen includes the operation-receiving region and a preview region.

21. A non-transitory recording medium storing a computer readable control program causing a computer of a portable terminal including a display, the portable terminal being allowed to communicate with an image forming apparatus for printing an image onto a recording medium, to perform:
determining whether a cooperative screen for cooperating with the image forming apparatus includes, in addition to an image preview, an operation-receiving region for receiving an operation by a user, the cooperative screen being displayed on the display;
extracting, from the cooperative screen, an image corresponding to an operating region including the operation-receiving region, without the image preview, when the determining determines that the cooperative screen includes the operation-receiving region; and
transmitting, to the image forming apparatus, the image corresponding to the operating region extracted by the extracting.

22. The non-transitory recording medium according to claim 21, wherein
the operation-receiving region is an item of settings relating to functions of the image forming apparatus.

23. The non-transitory recording medium according to claim 21, wherein
the extracting comprises extracting the image corresponding to the operation-receiving region from the cooperative screen when the determining determines that the cooperative screen includes the operation-receiving region and a preview region.

* * * * *